United States Patent
Chun et al.

(10) Patent No.: US 7,525,541 B2
(45) Date of Patent: Apr. 28, 2009

(54) DATA PROCESSING FOR THREE-DIMENSIONAL DISPLAYS

(75) Inventors: Won Chun, Cambridge, MA (US); Oliver Strider Cossairt, Cambridge, MA (US)

(73) Assignee: Actuality Systems, Inc., Bedford, MA (US)

(*) Notice: Subject to any disclaimer, the term of this patent is extended or adjusted under 35 U.S.C. 154(b) by 295 days.

(21) Appl. No.: 11/082,169

(22) Filed: Mar. 16, 2005

(65) Prior Publication Data

US 2005/0230641 A1 Oct. 20, 2005

Related U.S. Application Data

(60) Provisional application No. 60/560,006, filed on Apr. 5, 2004.

(51) Int. Cl.
G09G 3/00 (2006.01)
G09G 3/34 (2006.01)
G06F 17/00 (2006.01)
G06T 1/00 (2006.01)
G06T 15/00 (2006.01)

(52) U.S. Cl. .................... 345/419; 345/30; 345/31; 345/32; 345/108; 345/110

(58) Field of Classification Search .......... 345/419, 345/30–32, 108, 110
See application file for complete search history.

(56) References Cited

U.S. PATENT DOCUMENTS

| | | | |
|---|---|---|---|
| 4,834,476 A * | 5/1989 | Benton | 359/23 |
| 5,172,251 A | 12/1992 | Benton et al. | |
| 5,521,724 A * | 5/1996 | Shires | 359/22 |
| 5,706,061 A * | 1/1998 | Marshall et al. | 348/743 |
| 5,710,875 A | 1/1998 | Harashima et al. | |
| 5,745,197 A * | 4/1998 | Leung et al. | 349/77 |
| 5,748,347 A * | 5/1998 | Erickson | 359/23 |
| 5,971,547 A * | 10/1999 | Reilley | 353/122 |
| 6,023,523 A | 2/2000 | Cohen et al. | |
| 6,097,394 A | 8/2000 | Levoy et al. | |
| 6,183,088 B1 | 2/2001 | LoRe et al. | |
| 6,201,565 B1 * | 3/2001 | Balogh | 348/40 |
| 6,229,561 B1 * | 5/2001 | Son et al. | 348/42 |
| 6,266,167 B1 * | 7/2001 | Klug et al. | 359/12 |
| 6,300,986 B1 * | 10/2001 | Travis | 349/5 |
| 6,330,088 B1 * | 12/2001 | Klug et al. | 359/23 |
| 6,416,181 B1 * | 7/2002 | Kessler et al. | 353/7 |
| 6,456,339 B1 * | 9/2002 | Surati et al. | 348/745 |

(Continued)

OTHER PUBLICATIONS

Foley, James D.; van Dam, Andries; Feiner, Steven k.; Hughes, John F.; "Computer Graphics Principles and Practice;" 1996, Addison-Wesley Publishing Company; Second Edition; pp. 229-250 and 701-715.*

(Continued)

Primary Examiner—Wesner Sajous
Assistant Examiner—Crystal Murdoch
(74) Attorney, Agent, or Firm—Fish & Richardson P.C.

(57) ABSTRACT

Generating a three-dimensional image of a three-dimensional scene by generating projection data and projecting light rays based on the projection data to generate the three-dimensional image. Sampling of the data is based on at least one physical parameter associated with the projection of light rays by a projection system used to project the light rays.

40 Claims, 27 Drawing Sheets

U.S. PATENT DOCUMENTS

| | | | |
|---|---|---|---|
| 6,473,209 B1* | 10/2002 | Popovich | 359/22 |
| 6,473,238 B1* | 10/2002 | Daniell | 359/622 |
| 6,487,020 B1 | 11/2002 | Favalora | |
| 6,489,961 B1 | 12/2002 | Baxter, III et al. | |
| 6,512,498 B1 | 1/2003 | Favalora et al. | |
| 6,525,847 B2* | 2/2003 | Popovich et al. | 359/15 |
| 6,550,918 B1* | 4/2003 | Agostinelli et al. | 353/7 |
| 6,554,430 B2 | 4/2003 | Dorval et al. | |
| 6,587,276 B2* | 7/2003 | Daniell | 359/622 |
| 6,631,016 B1 | 10/2003 | Klug et al. | |
| 6,661,548 B2* | 12/2003 | Klug et al. | 359/23 |
| 6,702,442 B2* | 3/2004 | Agostinelli et al. | 353/7 |
| 6,721,101 B2* | 4/2004 | Daniell | 359/626 |
| 6,753,990 B1 | 6/2004 | Payne et al. | |
| 6,798,390 B1* | 9/2004 | Sudo et al. | 345/7 |
| 6,831,678 B1* | 12/2004 | Travis | 348/46 |
| 6,940,645 B2* | 9/2005 | Liang et al. | 359/462 |
| 6,992,718 B1* | 1/2006 | Takahara | 348/333.09 |
| 7,023,466 B2* | 4/2006 | Favalora et al. | 348/42 |
| 2001/0005261 A1* | 6/2001 | Martin et al. | 353/7 |
| 2002/0015042 A1* | 2/2002 | Robotham et al. | 345/581 |
| 2002/0075452 A1* | 6/2002 | Kessler et al. | 353/7 |
| 2002/0135673 A1* | 9/2002 | Favalora et al. | 348/42 |
| 2002/0190922 A1* | 12/2002 | Tsao | 345/32 |
| 2003/0020879 A1* | 1/2003 | Sonehara | 353/7 |
| 2003/0067539 A1* | 4/2003 | Doerfel et al. | 348/51 |
| 2003/0071813 A1* | 4/2003 | Chiabrera et al. | 345/426 |
| 2003/0107712 A1* | 6/2003 | Perlin | 353/31 |
| 2003/0112507 A1* | 6/2003 | Divelbiss et al. | 359/464 |
| 2003/0137730 A1* | 7/2003 | Fridman et al. | 359/462 |
| 2003/0142379 A1* | 7/2003 | Takemori et al. | 359/35 |
| 2003/0151785 A1* | 8/2003 | Vertoprakhov | 359/15 |
| 2004/0001139 A1* | 1/2004 | Kobayashi | 348/59 |
| 2004/0056824 A1* | 3/2004 | Sudo et al. | 345/7 |
| 2004/0080938 A1* | 4/2004 | Holman et al. | 362/231 |
| 2004/0150583 A1* | 8/2004 | Fukushima et al. | 345/6 |
| 2004/0184145 A1* | 9/2004 | Fridman et al. | 359/462 |
| 2004/0208358 A1* | 10/2004 | Tooyama et al. | 382/154 |
| 2004/0212882 A1* | 10/2004 | Liang et al. | 359/462 |
| 2004/0218037 A1* | 11/2004 | Kowel et al. | 348/51 |
| 2005/0030308 A1* | 2/2005 | Takaki | 345/419 |
| 2005/0052714 A1* | 3/2005 | Klug et al. | 359/3 |
| 2005/0122549 A1* | 6/2005 | Goulanian et al. | 359/3 |
| 2005/0134949 A1* | 6/2005 | Takemori et al. | 359/31 |
| 2005/0213182 A1* | 9/2005 | Cossairt et al. | 359/244 |
| 2005/0219693 A1* | 10/2005 | Hartkop et al. | 359/462 |
| 2005/0285027 A1* | 12/2005 | Favalora et al. | 250/234 |
| 2006/0103932 A1* | 5/2006 | Relke et al. | 359/462 |
| 2006/0158729 A1* | 7/2006 | Vissenberg et al. | 359/462 |
| 2006/0262395 A1* | 11/2006 | Ijzerman et al. | 359/462 |
| 2006/0279567 A1* | 12/2006 | Schwerdtner et al. | 345/419 |
| 2007/0053034 A1* | 3/2007 | Payne | 359/31 |
| 2007/0081225 A1* | 4/2007 | Aubuchon | 359/291 |
| 2007/0133076 A1* | 6/2007 | Endo et al. | 359/15 |
| 2007/0146234 A1* | 6/2007 | Taira et al. | 345/6 |

OTHER PUBLICATIONS

Chai et al., "Plenoptic Sampling", International Conference on Computer Graphics and Interactive Techniques, Proceedings of the 27th Annual Conference on Computer Graphics and Interactive Techniques, pp. 307-318 (2000).

Favalora et al., "100 Million-voxel volumetric display", Cockpit Displays IX: Displays for Defense Applications, SPIE Proceedings vol. 4712, pp. 300-312 (Apr. 2002).

Favalora et al., "A Multi-Megavoxel Volumetric 3-D Display System for Distributed Collaboration", IEEE Globecom 2000 Conference, San Francisco, CA (Nov. 2000).

Funkhouser, Thomas, "Image Quantization, Halftoning, and Dithering", (Fall 2000), retrieved from the Internet on Feb. 16, 2005, http://www.cs.princeton.edu/courses/archive/fall00/cs426/lectures/dither/dither.pdf.

S.J. Gortler, et al., "The Lumigraph", Proceedings of the $23^{rd}$ Annual Conference on Computer Graphics and Interactive Techniques, pp. 43-54. ACM SIGGRAPH (1996).

Halle, Michael W., "Multiple Viewpoint Rendering for Three-Dimensional Displays", PhD Thesis, Massachusetts Institute of Technology (Jun. 1997).

Halle, Michael W., "Multiple Viewpoint Rendering", Proceedings of SIGGRAPH '98 (Orlando, FL, Jul. 19-24, 1998). Computer Graphics Proceedings, Annual Conference Series, pp. 243-254.

Halle, Michael W., "Holographic stereograms as discrete imaging systems", SPIE Proceeding #2176 "Practical Holography VIII" (SPIE Bellingham, WA, Feb. 1994) paper #10, pp. 73-84.

Honda et al., "Three-dimensional display technologies satisfying "super multiview condition"", in Three-Dimensional Video and Display: Devices and Systems, proceedings of a conference held Nov. 5-6, 2000, Boston, SPIE Press, vol. CR76, pp. 218-249.

Levoy et al., "Light Field Rendering", Proceedings on the $23^{rd}$ Annual Conference on Computer Graphics and Interactive Techniques, pp. 31-42, ACM SIGGRAPH (Jul. 1996).

Lucente, Mark, "Electronic Holography: "Holovideo"" retrieved from the Internet on Feb. 22, 2005, http://xenia.media.mit.edu/~lucente/holo/holovideo.html.

Zhang et al., "Generalized Plenoptic Sampling", Technical Report, Carnegie Mellon University, Pittsburg, PA (Sep. 2001).

* cited by examiner

DATA PROCESSING FOR THREE-DIMENSIONAL DISPLAYS

CROSS-REFERENCE TO RELATED APPLICATIONS

This application claims priority from U.S. Provisional Application No. 60/560,006, filed Apr. 5, 2004, the contents of which are incorporated herein by reference.

STATEMENT AS TO FEDERALLY SPONSORED RESEARCH

This invention was made with United States Government support under cooperative agreement number 70NANB3H3028 awarded by the National Institute of Standards and Technology (NIST). The United States Government has certain rights in the invention.

BACKGROUND

This invention relates to data processing for three-dimensional displays.

Image based rendering can be used to generate data for realistic representation of three-dimensional (3-D) images on 3-D displays, such as multi-view or holographic 3-D displays. Images of an object (or a scene) captured from several viewpoints are used for generating new images of the object as viewed from different viewpoints. In a multi-view 3-D display, the 3-D image of the object can be viewed from multiple view angles. A 3-D display creates imagery of the object that provides one or more stereoscopic depth cues, such as motion parallax, to create the perception of a 3-D scene. The 3-D display processes the light field of the 3-D scene and computes trajectories of the constituent light rays that exit an image surface to generate the light field.

The term "light field" herein refers to a collection of light rays that emanate from particular positions and propagate along particular paths. Some of the light rays may be occluded and not seen from certain angles. The phrase "light field of an object" refers to the collection of light rays that emanate from the object. The phrase "light field rendering" refers to generating data that can be used by a 3-D display to project light rays from appropriate positions along appropriate directions to generate the light field.

As an example, referring to FIG. 1, to generate an image point 2 in 3-D space, several light rays (e.g., 4a, 4b, 4c, and 4d) are projected from points 14a to 14d positioned on a horizontal region 6 of an image surface 8. The rays converge at and emanate from the image point 2, and each light ray has a color and brightness that represent the color and brightness of the image point 2 when viewed along the direction of the light ray. An observer at a first position 10 receives light rays 4a and 4b in his left and right eyes. The slight difference in the rays 4a and 4b provides a depth cue. When the observer moves horizontally to a second position 12, he sees the rays 4c and 4d, whose difference also generates a depth cue. As the observer moves, he has the illusion of viewing the same image point 2 from different viewing angles even though the light rays are actually projected from different locations on the image surface 8. In this example, the light field for the image point 2 includes the light rays 4a to 4d, and may include additional light rays. Rendering the light field includes determining the projection locations 14a to 14d, the projection directions of the light rays 4a to 4d, and the color and brightness of the light rays 4a to 4d.

Referring to FIG. 2, a multi-view 3-D display 24 includes spatial light modulators (SLM) 20, such as DIGITAL MICROMIRROR DEVICES™ (DMDs) from Texas Instruments, Inc., Plano, Tex. Each DMD has an array of rows and columns of pixels that can be individually switched on and off, and can be programmed with a particular pattern to modulate light from a light source (not shown) to form presentation images that are projected by projection optics (not shown) onto the image surface 22. Projecting a presentation image means projecting light rays that represent the presentation image. The collection of presentation images (or the collection of light rays representing the presentation images) generates a light field that approximates the light field an observer would see from a real 3-D object.

In one example, an array of SLMs are positioned along a horizontal direction, and the image surface 22 is a screen that diffuses light rays vertically but does not change the horizontal propagation directions of the light rays. This differs from a normal screen, such as the screen of a conventional television or computer monitor, in which each point on the screen produces light rays that propagate essentially as a hemispherical wavefront (in various vertical and horizontal directions), so that the same point can be seen from different vertical and horizontal view angles. The image surface 22 does not change the horizontal propagation direction of a light ray, so that unless the observer is located at a particular horizontal position, he will not see the light ray.

For each point on the 3-D object, different light rays representing the point as viewed from different directions are projected along different horizontal directions, so that the observer sees different light rays from different horizontal view angles. This allows the display 24 to generate 3-D images with horizontal parallax, in which different views of the object can be perceived when the observer moves horizontally (e.g., from position 10 to 12), but substantially the same view of the object is perceived when the observer moves vertically.

Alternatively, a two-dimensional array of SLMs and an image surface 22 that does not diffuse light rays can be used to generate a 3-D image with full parallax, in which different views of the object can be perceived when the observer moves either horizontally or vertically.

Rather than using multiple spatial light modulators, one spatial light modulator (or a subset of the array of SLMs) can be used. In this case, the presentation images are synthesized in a time-division-multiplexed manner so that different presentation images are projected from different positions at different times. At any instant, a subset of the required rays, with various angles, emanate through the image surface 24. The collection of the light rays integrated over a short period of time approximates complete wave fronts emanating from the 3-D object. If the SLM operates sufficiently fast, and if the projection optics project the different presentation images from different locations within a sufficiently short period of time (such as $\frac{1}{30}$ second), persistence of vision causes the image of the 3-D object to look complete. As a result, the light rays look to an observer as if they had all been emitted from the 3-D object at the same time.

An example of a multi-view 3-D display is disclosed in Provisional Patent Application 60/555,602, "Scanned Multiview Three-Dimensional Display," filed Mar. 23, 2004, herein incorporated by reference.

SUMMARY

In general, in one aspect, the invention features a method of processing image data that includes generating projection data by sampling data representing a three-dimensional scene, the sampling based on at least one physical parameter associated with projection of light rays by a projection system. The method includes causing the projection system to project light rays based on the projection data to generate a three-dimensional image representative of the scene.

Implementations of the invention may include one or more of the following features. The method includes defining an image surface onto which the light rays are projected. Sampling data includes sampling based on at least one of (a) a size of the image surface, (b) a shape of the image surface, and (c) a position of the image surface relative to intended observation positions for observing the three-dimensional image. The method includes defining positions from which the light rays appear to be projected. Sampling data includes sampling based on at least one of (a) a position of the image surface relative to positions from which the light rays appear to be projected, and (b) an extent of a region from which the light rays appear to be projected. Projecting the light rays includes focusing light rays that are modulated by a spatial light modulator, in which the light rays are focused on the positions from which the light rays appear to be projected. The spatial light modulator modulates the light rays based on the projection data. Defining an image surface includes defining an image surface that diffuses the light rays only along a specified direction. The three-dimensional scene includes at least one of a collection of points, a collection of lines, a collection of surfaces, and a collection of volumes. Generating projection data includes generating data that specify at least one of color and brightness of light rays that propagate along specified paths relative to the image surface.

The data representing the three-dimensional scene includes information about observations of the three-dimensional scene from different positions. The data representing the three-dimensional scene includes images of the three-dimensional scene captured by at least one camera from different positions. The camera has a pixel resolution that is different from a pixel resolution of a spatial light modulator used to modulate the projected light rays. Sampling data includes sampling data to compensate for distortions in the images. The data representing the three-dimensional scene includes synthesized images of the three-dimensional scene as viewed from different positions. The synthesized images each has a pixel resolution that is different from a pixel resolution of a spatial light modulator used to modulate the projected light rays. Projecting light rays includes projecting a first set of modulated light rays from a first position during a first interval, and projecting a second set of modulated light rays from a second position during a second interval. The three-dimensional image includes an image of at least one of an accurate copy, an approximation, a closer view, and a farther view of the three-dimensional scene. The data representing the three-dimensional scene includes information about at least one of color and brightness of light rays emanating from the three-dimensional scene.

In general, in another aspect, the invention features a method of processing image data that includes generating sets of projection data by sampling data representing a three-dimensional scene, the sampling based on a physical parameter associated with a projection system, the sets of projection data having information representing light rays that, when projected, generate a three-dimensional image representative of the three-dimensional scene.

In general, in another aspect, the invention features a method of processing image data that includes sampling a view volume, which includes data representing a three-dimensional scene, to generate projection data, the sampling based at least on a parameter associated with an image surface and with projection positions that define locations from which light rays appear to be projected. The method includes projecting light rays from the projection positions toward the image surface based on the projection data, thereby generating a three-dimensional image that is representative of the three-dimensional scene.

In general, in another aspect, the invention features a method of processing image data that includes generating a view volume that includes data representing observations of a three-dimensional scene from different positions; sampling the view volume to generate projection data, the sampling based on at least a position of an image surface relative to a position of a presentation surface; modulating light rays based on the projection data to generate presentation images; and projecting the presentation images from the presentation surface toward the image surface to reproduce a three-dimensional image that is representative of the three-dimensional scene.

In general, in another aspect, the invention features a method of processing image data that includes dithering a series of images using dither matrices to generate a series of dithered images, in which each two consecutive images are dithered using two different dither matrices; and projecting the dithered images from a plurality of locations to generate a three-dimensional image of a three-dimensional scene.

Implementations of the invention may include one or more of the following features. Two consecutive images are dithered by a first dither matrix and a second dither matrix generated by rotating the first dither matrix by 90 degrees. Each dither matrix includes N rows and N columns of cells, and a cell (i, j) in the second matrix has a same value as a cell (j, N−i+1) in the first matrix. Four consecutive images are dithered by a first dither matrix, a second dither matrix, a third dither matrix, and a fourth dither matrix, in which the second, the third, and the fourth dither matrices are rotations of the first dither matrix by 90, 180, and 270 degrees, respectively. The dither matrix includes a dispersed dot dither matrix.

In general, in another aspect, the invention features a method of processing image data that includes receiving an image having pixels, each of which defines a pixel value; and for each group of n pixels of the image, storing the most significant bit of each of the n pixel values in an n-bit binary number by successively adding each of the n pixel values to a shift register and shifting the value in the shift register by one bit after the addition, thereby generating compressed image data.

Implementations of the invention may include the following feature. The method includes driving a spatial light modulator, such as a DIGITAL MICROMIRROR DEVICE™, based on the compressed image data.

In general, in another aspect, the invention features a method of processing image data that includes sending at least one physical parameter of a projection system to a server having data representing a three-dimensional scene. At the projection system, projection data is received from the server, in which the projection data are derived by sampling the data representing the three-dimensional scene based on the at least one physical parameter. At the projection system, light rays are projected based on the projection data to generate a three-dimensional image of the three-dimensional scene.

Implementations of the invention may include one or more of the following features. The method includes sending at least one physical parameter of the projection system to a second server having data representing a second three-dimensional scene. At the projection system, a second set of projection data is received from the second server, the second set of projection data derived by sampling the data representing the second three-dimensional scene based on the at least one physical parameter. At the projection system, light rays are projected based on the projection data to generate a three-dimensional image of the second three-dimensional scene.

In general, in another aspect, the invention features a method of processing image data that includes, at a server having data representing a three-dimensional scene, receiving at least one physical parameter of a projection system. At the server, projection data are generated by sampling the data representing the three-dimensional scene based on the at least one physical parameter. The projection data are transmitted from the server to the projection system to enable the projection system to project light rays based on the projection data to generate a three-dimensional image of the three-dimensional scene.

Implementations of the invention may include one or more of the following features. The method includes, at the server, receiving at least one physical parameter of a second projection system; at the server, generating a second set of projection data by sampling the data representing the three-dimensional scene based on the at least one physical parameter of the second projection system; and transmitting the second set of projection data from the server to the second projection system to enable the second projection system to project light rays based on the projection data to generate a three-dimensional image of the three-dimensional scene.

In general, in another aspect, the invention features a method of processing image data that includes generating a stream of data representing observations of a three-dimensional scene from a set of positions; at a given time, storing a subset of the stream of data, the subset representing observations of the three-dimensional scene from a subset of the positions; generating a stream of projection data by sampling the stored subset of the stream of data; and projecting light rays based on the stream of projection data to generate a three-dimensional image of scene.

Implementations of the invention may include one or more of the following features. The method includes defining an image surface onto which the light rays are projected. Sampling the stored subset of the stream of data includes sampling based on at least one of (a) a position of the image surface relative to positions from which the light rays appear to be projected, (b) a position of the image surface relative to intended observation positions for observing the three-dimensional image, (c) a size of the image surface, (d) an extent of positions from which the light rays appear to be projected, and (e) a shape of the image surface. The stream of data representing observations of the scene ends after data representing observations of the scene from all of the set of positions have been generated. The stream of data representing observations of the scene repeats itself after data representing observations of the scene from all of the set of positions have been generated In general, in another aspect, the invention features an image data processing apparatus that includes a data processor to generate projection data by sampling data representing a three-dimensional scene; and a projection device to project light rays based on the projection data to generate a three-dimensional image that is representative of the three-dimensional scene, in which the sampling of data by the data processor is based on a physical parameter associated with projection of the light rays.

Implementations of the invention may include one or more of the following features. The projection device defines an image surface onto which the light rays are projected. The data processor samples the data based on at least one of (a) a size of the image surface, (b) a shape of the image surface, and (c) a position of the image surface relative to intended observation positions for observing the three-dimensional image. The projection device includes a spatial light modulator that modulates light rays according to the projection data. The projection device defines projection positions from which light rays modulated by the spatial light modulator appear to be projected. The data processor samples the data based on at least one of (a) a position of the image surface relative to the projection positions, and (b) a farthest distance between any two projection positions. The spatial light modulator modulates light rays to generate different presentation images at different times according to the projection data, and the projection device projects the presentation images from different projection positions in a time-division-multiplexed manner.

In general, in another aspect, the invention features a machine-accessible medium, which when accessed results in a machine performing operations includes generating projection data by sampling data representing a three-dimensional scene, the sampling based on at least one physical parameter associated with projection of light rays by a projection system; and projecting light rays based on the projection data to generate a three-dimensional image that is representative of the scene.

Implementations of the invention may include one or more of the following features. The machine-accessible medium when accessed results in the machine performing operations includes controlling a spatial light modulator to modulate projected light rays based on the projection data. The machine-accessible medium when accessed results in the machine performing operations includes projecting light rays modulated by the spatial light modulator from different positions in a time-division-multiplexed manner.

In general, in another aspect, the invention features an apparatus for processing image data that includes a projection system for projecting light rays; and means for generating projection data by sampling data representing a three-dimensional scene based on at least one physical parameter associated with projection of light rays by the projection system, in which light rays projected by the projection system based on the projection data generate a three-dimensional image that is representative of the scene.

Unless otherwise defined, all technical and scientific terms used herein have the same meaning as commonly understood by one of ordinary skill in the art to which this invention belongs. All of the publications, patent applications, patents, and other references mentioned are incorporated herein by reference. In case of conflict with the references incorporated by reference, the present specification, including definitions, will control.

Other features and advantages of the invention are apparent from the following description, and from the claims.

DESCRIPTION

Figure 1:
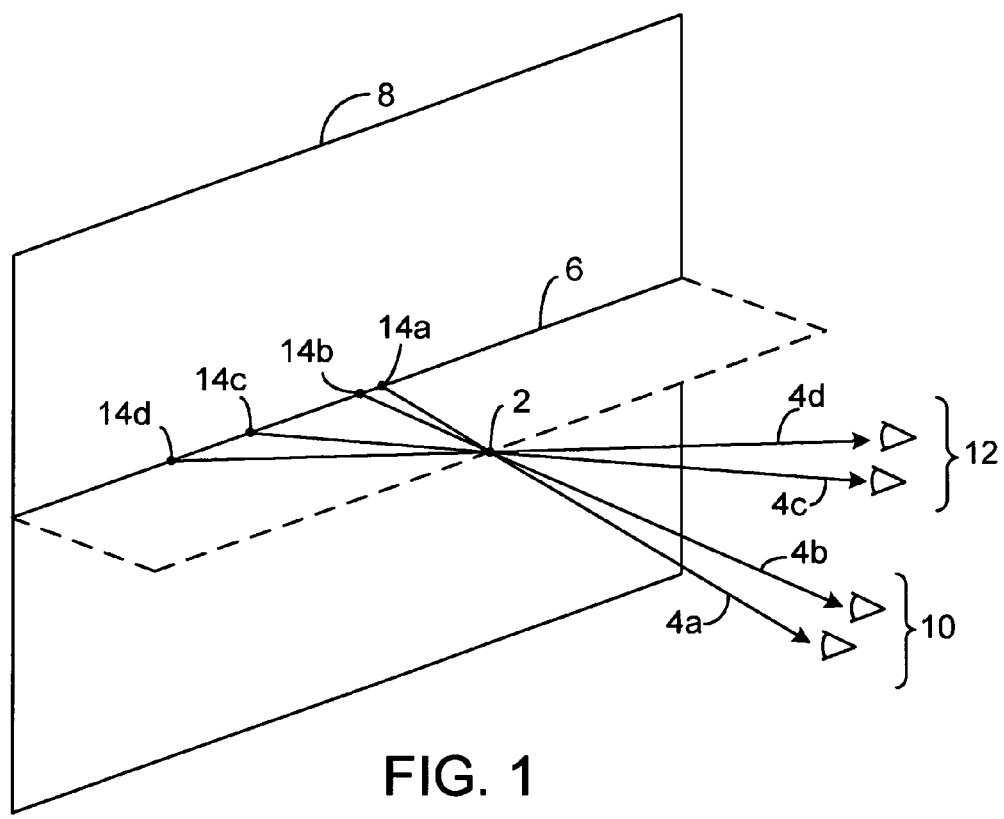
FIG. 1 shows an image point being generated by a, 3-D display.
Figure 2:
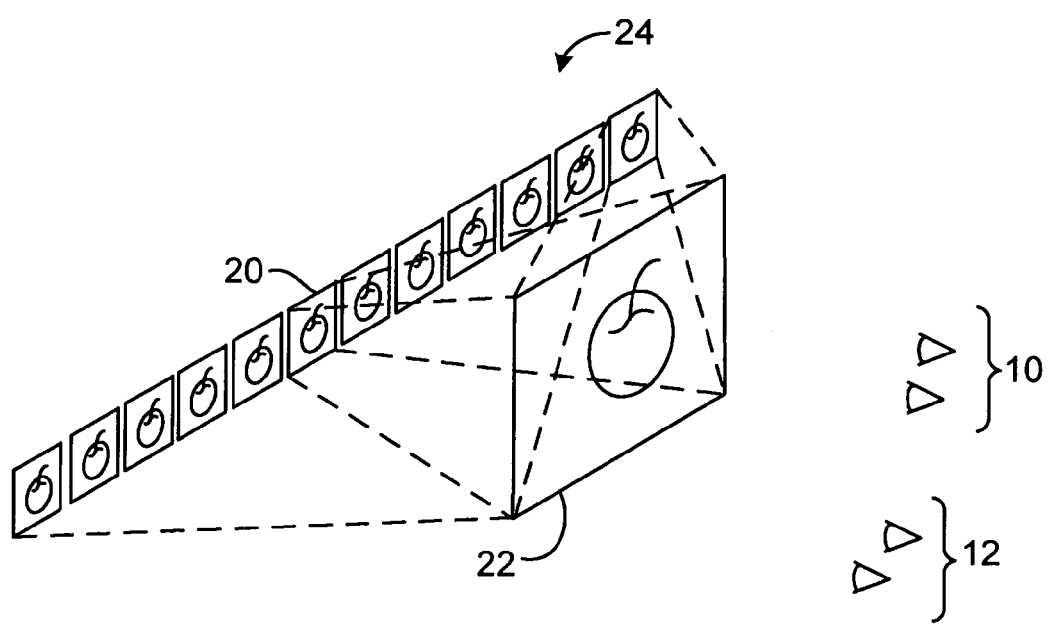
FIG. 2 shows an array of spatial light modulators that project presentation images on an image surface.
Figure 3A:
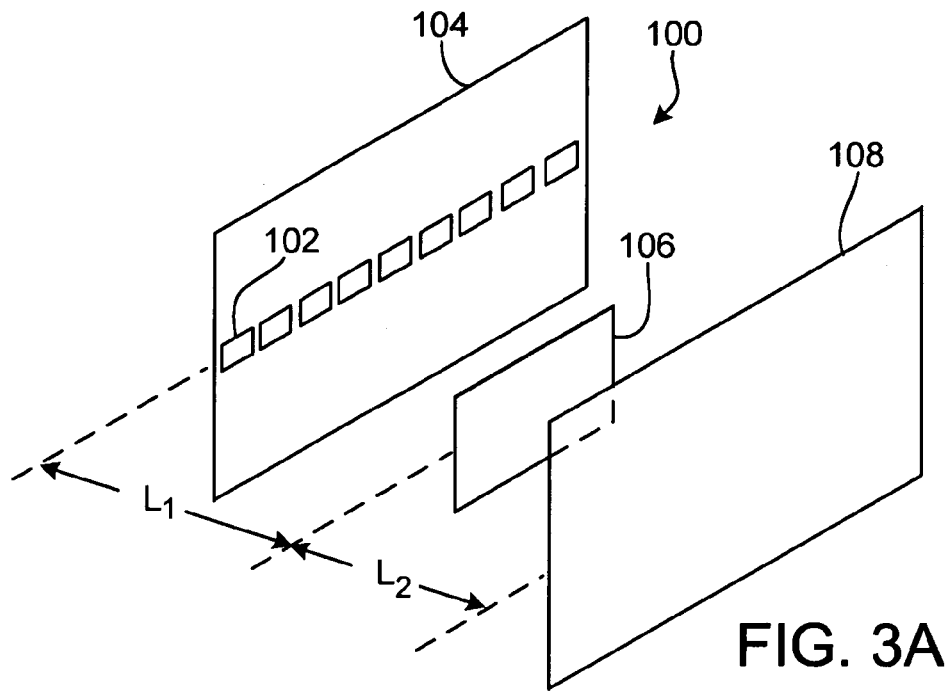
FIGS. 3A-3C show different configurations for 3-D displays.

FIG. 3A shows an arrangement for an example of a multi-view 3-D display 100 for generating a realistic 3-D image of a 3-D object (or scene). Spatial light modulators (SLMs) 102 are positioned horizontally along a presentation surface 104. Presentation images are projected from the SLMs through projection optics (not shown) onto an image surface 106 to generate a light field of a 3-D object. Each point on the 3-D object may be represented by light rays generated from different presentation images projected from different SLMs. In order for the lights rays projected from different SLMs to correctly reproduce wavefronts of the 3-D object, the presentation images are designed taking into account the particular physical parameters (e.g., geometries) of the presentation surface 104, image surface 106, and observation surface 108, and their relative positions.

Figure 3B:
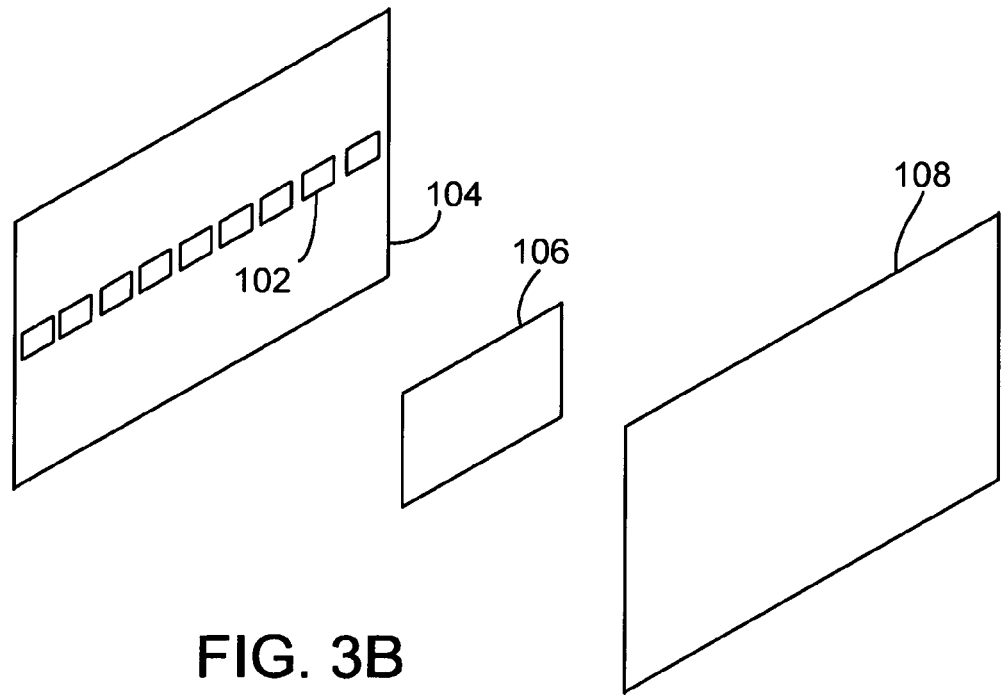
Figure 3C:
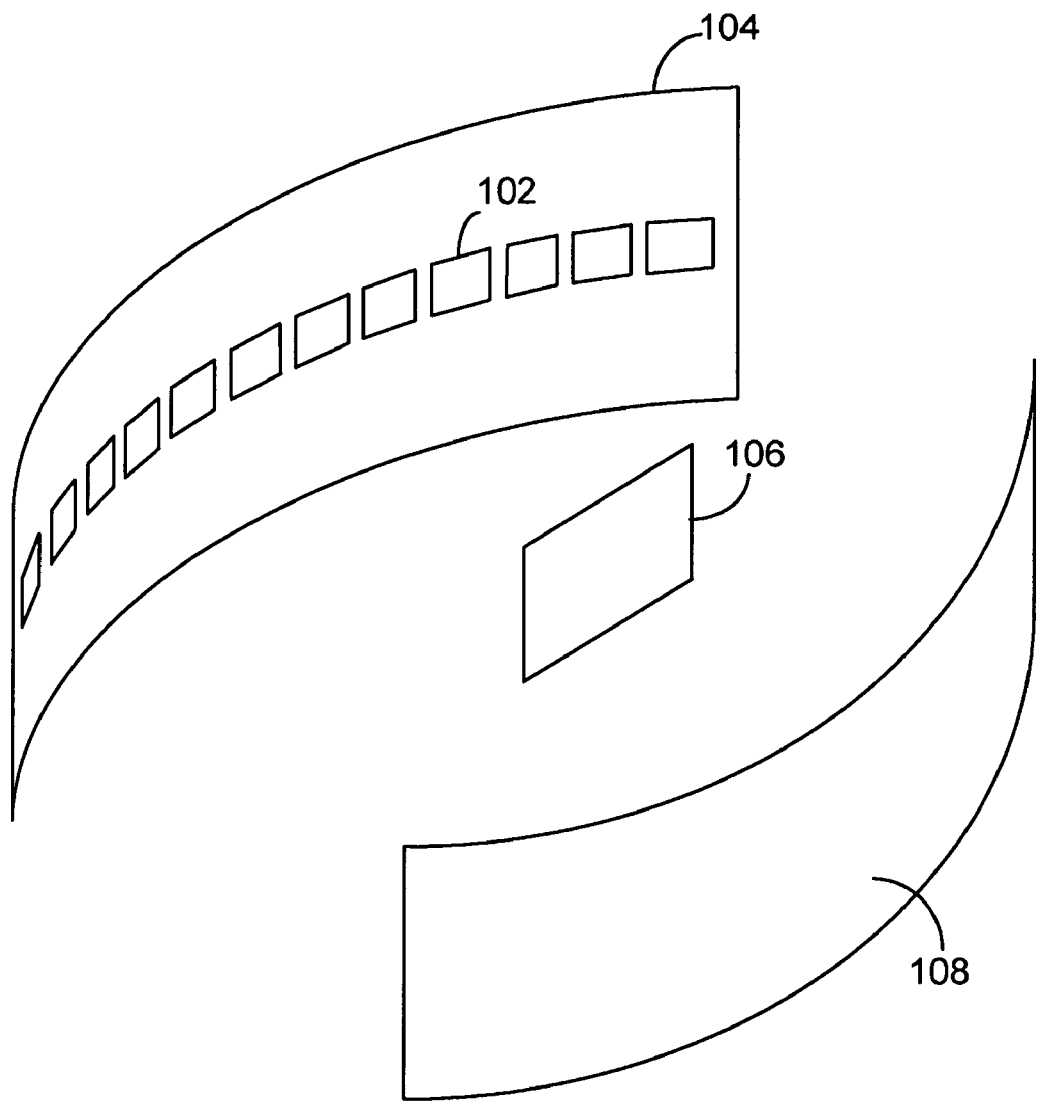

For example, if the distance L1 between the presentation surface 104 and the image surface 106 (and/or the distance L2 between the observation surface 108 and the image surface 106) changes, such as shown in FIG. 3B, the presentation images projected from each SLM 102 would have to change accordingly. Similarly, if the geometry of the presentation surface 104 (and/or the observation surface 108 and/or the imaging surface 106) changes, such as from a flat surface to a curved surface as shown in FIG. 3C, the presentation images would have to change accordingly.

The description below assumes that the 3-D display 100 generates 3-D images having a horizontal parallax effect. The same principle can be applied to 3-D displays that generate 3-D images having a full parallax effect.

Figure 4:
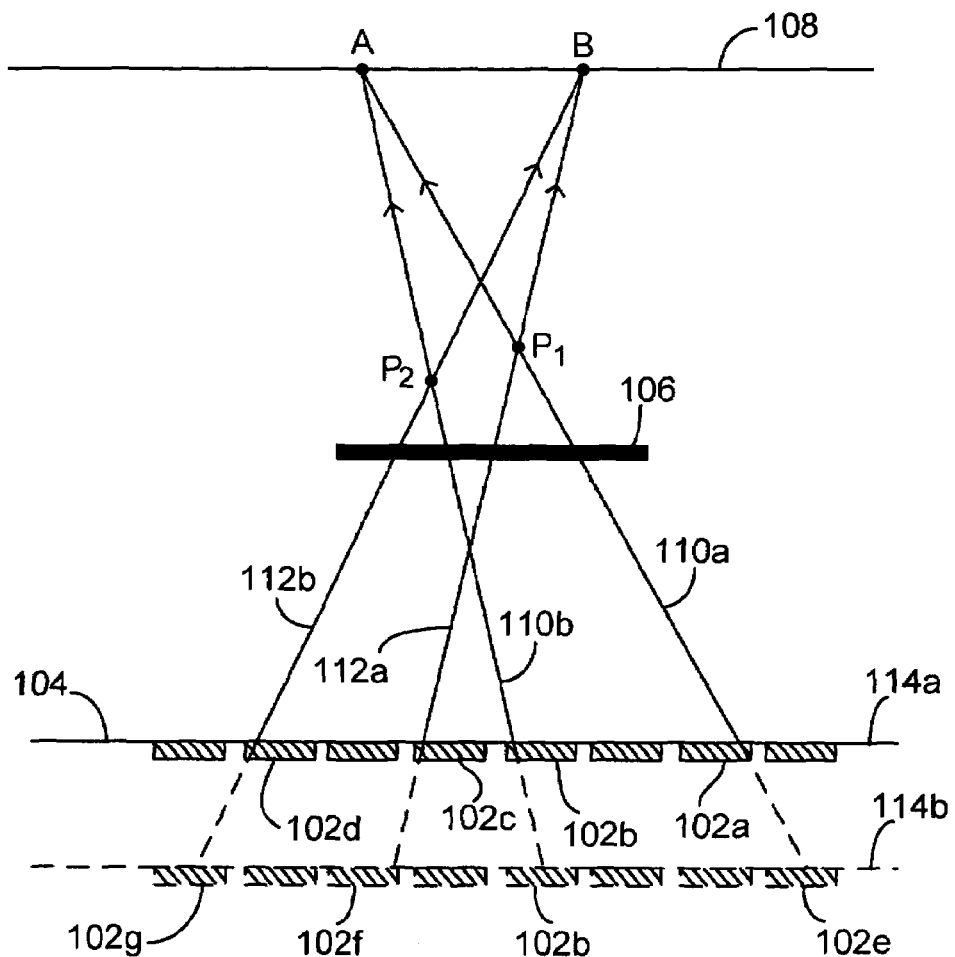
FIG. 4 shows a top view of a 3-D display.

FIG. 4, which is a top view of the arrangement of FIG. 3A, illustrates how changing the position of the presentation surface 104 relative to the image surface 106 affects the presentation images. Initially, the presentation surface 104 is located at a first position 114a. Light rays 110a and 110b are projected from the SLMs 102a and 102b, respectively, so that points P1 and P2 can be observed at an observation position A. Light rays 112a and 112b are projected from the SLMs 102c and 102d, respectively, so that points P1 and P2 can be observed at an observation position B.

When the presentation surface moves to a second position 114b, the same light rays 110a, 110b, 112a, and 112b would have to be generated by different SLMs, or different portions of the same SLM. For example, when the presentation surface 104 moves to the second position 114b, the light rays 110a, 110b, 110c, and 110d would have to be projected from SLMs 102e, 102b, 102f, and 102g, respectively.

Although the presentation images vary according to changes in the geometries or positions of the presentation surface 104, image surface 106, or observation surface 108, the presentation images can be re-sampled from a view volume that is invariant with respect to the changes. As described below, the view volume includes texture information that can be used to generate presentation images representing the light field of the 3-D object. This allows easy separation of the process of generating texture information for the 3-D object and the process of reproducing a 3-D image of the 3-D object. The texture information can be generated (e.g., by capturing images of the 3-D object from different viewpoints or by rendering images of the 3-D object using imaging software) without taking account of the specific configurations of the 3-D display. The texture information generated for a particular 3-D display can be conveniently reused for another 3-D display. Texture information of a 3-D object can be sent to remote locations without knowing in advance the configurations of the 3-D displays at the remote locations.

Figure 5:
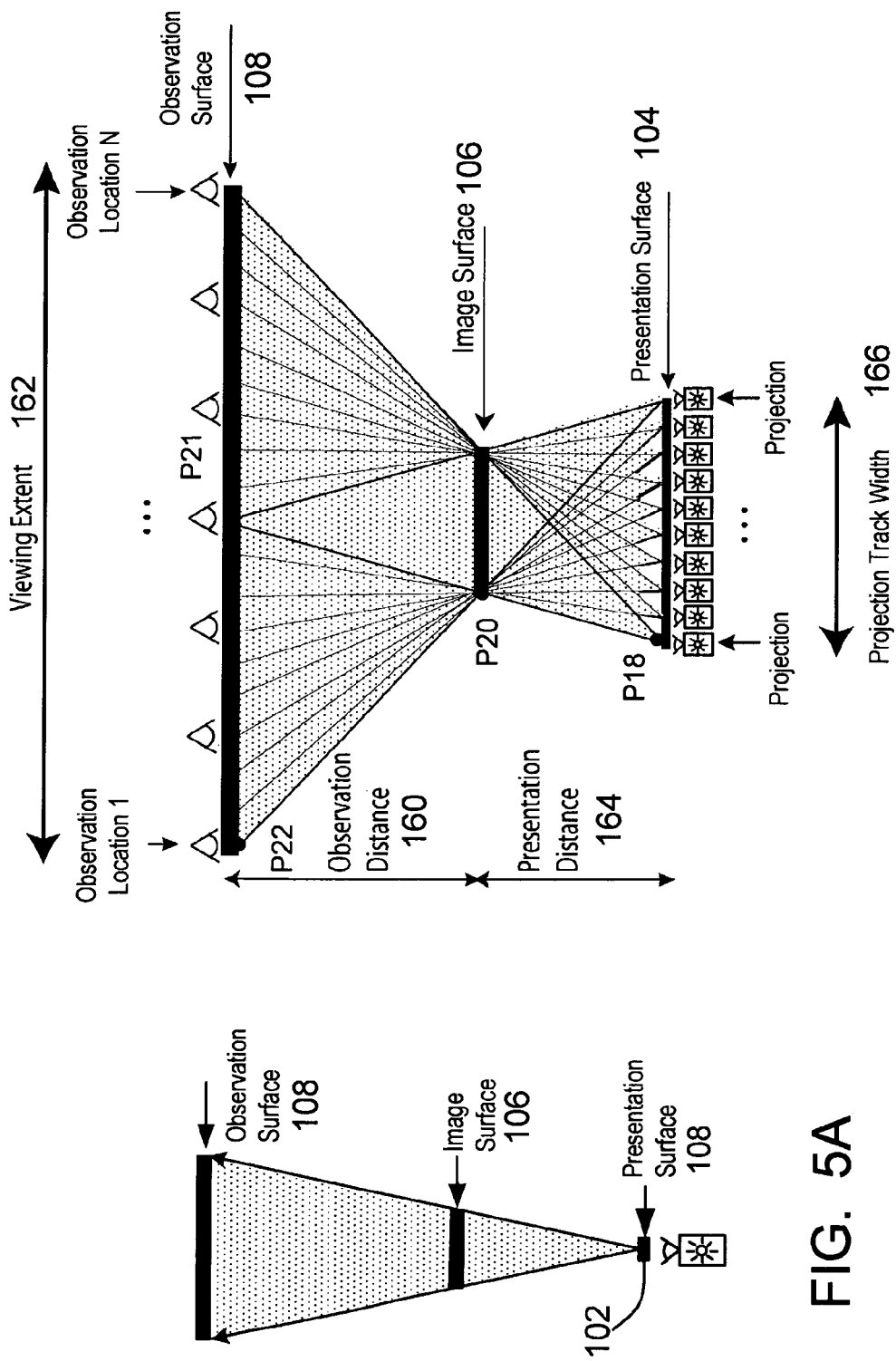
FIGS. 5A and 5B show side and top views of a 3-D display.

To generate a view volume, the first step is to determine an observation distance 160. FIGS. 5A and 5B show a side view and a top view, respectively, of a pseudoscopic 3-D display 100, in which the image surface 106 is positioned between the presentation surface 104 and the observation surface 108, and the size of the SLM is significantly smaller than the image surface 106. The presentation images are projected from SLMs whose dimensions are negligible compared to those of the image surface 106. For a given 3-D display configuration in which the width 166 of the presentation surface 104 (also referred to as a "projector track width") and the width of the image surface 106 are known, a width 162 of the observation surface 108 (also referred to as a "viewing extent") can be determined based on similar triangles from the values of a presentation distance 164 and the projector track width 166. For example, a triangle P20-P18-P19 is similar to a triangle P20-P21-P22. In subsequent rendering, the observation distance 160, presentation distance 164, projection track width 166, and viewing extent 162 are taken into account so that a 3-D image of a 3-D object can be rendered with the correct perspective.

In FIGS. 3A to 5B, the SLMs are located on the presentation surface 104. However, the spatial light modulator 102 can also be located away from the presentation surface 104. Projection optics may be used to focus the presentation images from the SLM onto the presentation surface 104, so that light rays appear to be projected from a location on the presentation surface 104. An example of such a configuration is shown in FIG. 4 of Provisional Application No. 60/555,602, "Scanned Multiview Three-Dimensional Display," filed Mar. 23, 2004.

In this description, the presentation surface 104 is used as a reference to show locations from which presentation images are projected (or appear to be projected). The presentation surface 104 does not need to correspond to any physical structure.

Figure 6:
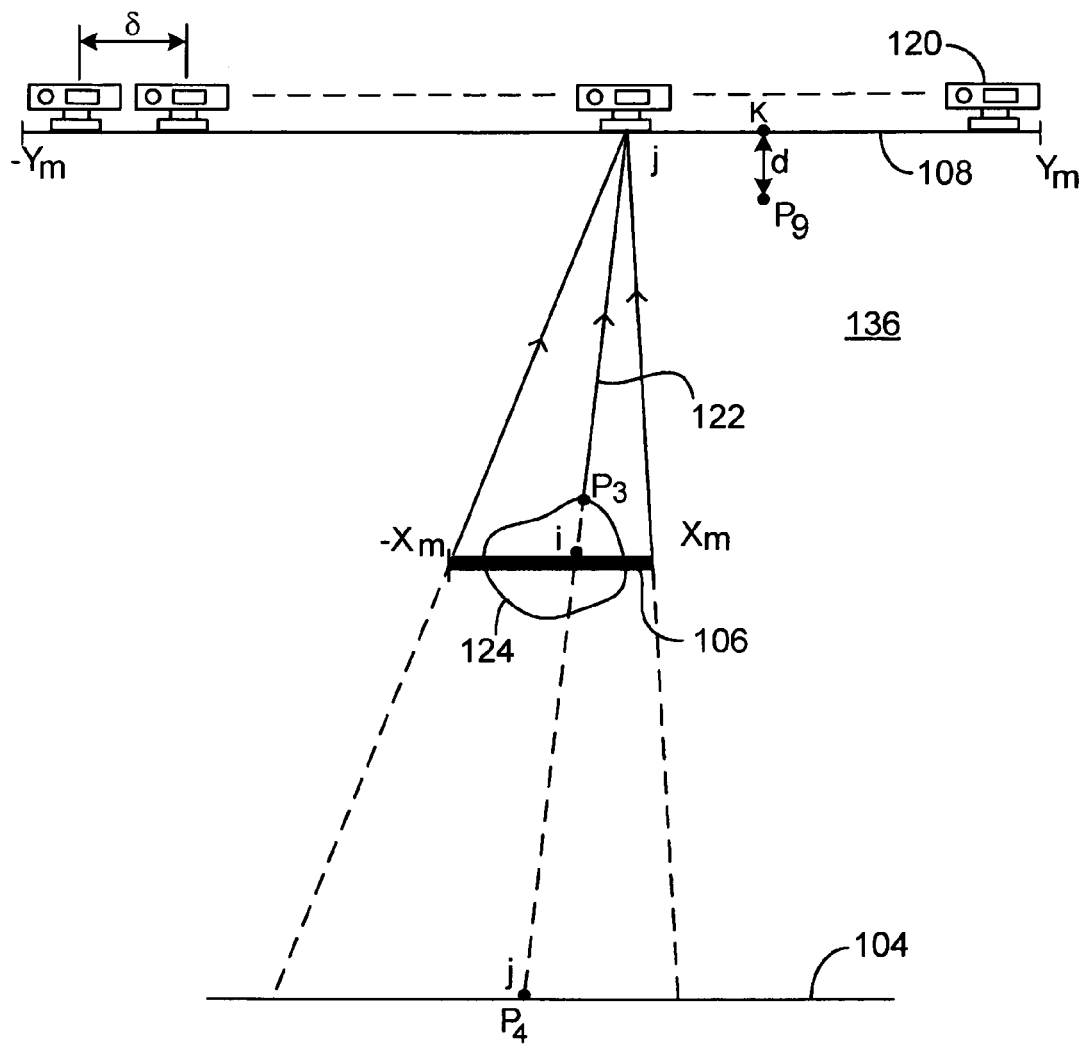
FIG. 6 shows a schematic view of images of an object being captured by a camera from different observation positions.

In one example, as shown in FIG. 6, the view volume is generated by using a digital camera 120 to capture images of a 3-D object 124 from different positions spaced apart by δ on the observation surface 108. Alternatively, the images of the 3-D object 124 can be synthesized by image processing software or hardware, in which the synthesized images represent images viewed from different positions spaced apart by δ on the observation surface 108. In one example, rendering of the images is performed on a graphics card, such as an NVIDIA® GeForce 5950 FX card. Several synthetic views are rendered in a single pass by clipping and stepping the viewport of a large off-screen frame buffer.

In another example, the camera 120 can be placed at positions on a capture surface (not shown) that is different from the observation surface 108, or the images can be synthesized by imaging software to represent images viewed from positions on a capture surface different from the observation surface 108. When the capture surface and the observation surface 108 are not coincident, an anamorphic camera can be used to correct perspective in the vertical direction.

The following description assumes that the capture surface coincides with the observation surface 108.

In one example, the observation surface has coordinates ranging from −Ym to Ym, and the image surface 106 has coordinates ranging from −Xm to Xm. Each ray emanating from the image surface 106 propagating towards the observation surface 108 can be represented by a pair of coordinates (i,j) that represent the coordinates of the positions at which the ray intersects the imaging surface 106 and the observation surface 108, respectively.

An image that is captured by the camera 120 at a position j on the observation surface 108 represents the image that an observer at the position j would see when the 3-D image of the object 124 is reproduced by the multi-view 3-D display 100. For example, the image of a point P3 on the object 124 as seen by an observer at position j is represented by a ray 122 emanating from P3 propagating towards position j. A projection of the ray 122 intersects the imaging surface 106 at a position i, and intersects the presentation surface 104 at a position P4. To reproduce the image point P3, a light ray is projected from the position P4 on the presentation surface 104 towards the position i on the imaging surface 106 so that the light ray propagates towards the position j on the observation surface 108.

The image captured by the camera 120 from position j on the observation surface 108 includes information about all the rays that are required to reconstruct an image of the 3-D object 124 as seen by an observer at position j. Thus, images of the 3-D object 124 captured from different positions, ranging from −Ym to Ym, on the observation surface 108 include information about light rays for reproducing a 3-D image of the 3-D object 124 that can be viewed from positions ranging from −Ym to Ym, in intervals of δ, along the observation surface 108.

In one example, each of the images captured by the camera 120 covers the area of the imaging surface 106 ranging from −Xm to Xm, and each of the presentation images projected from the presentation surface 104 covers the imaging screen 106 from positions −Xm to Xm.

Figure 7:
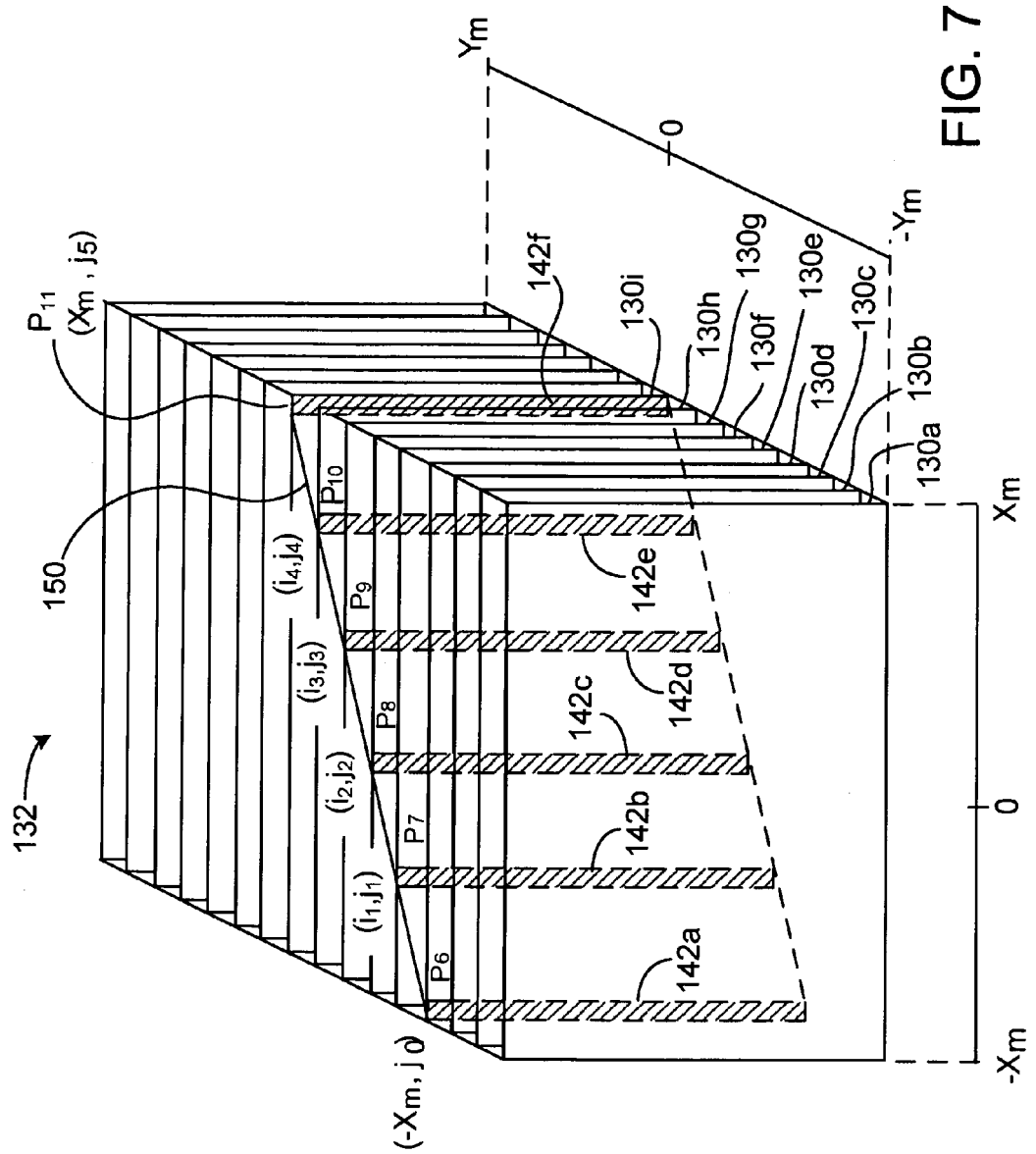
FIG. 7 shows a view volume.

Referring to FIG. 7, conceptually, images (e.g., 130a to 130i) captured by the camera 120 at positions ranging from −Ym to Ym on the observation surface 108 can be stacked in respective order to form a "view volume" 132 in which each image is a slice in the view volume 132. Adjacent image slices are spaced apart by δ (which is determined by the distance between adjacent image capture positions). The view volume 132 can be seen as a texture map that includes information about the texture of the object 124 as seen from different view angles.

In one example, the entire view volume is calculated simultaneously as a 3-D texture on an NVIDIA GeForce 5950 FX card. The synthesized images are read into the 3-D texture by stepping the viewport and reading pixels from the off-screen frame buffer into a slice in the 3-D texture.

Figure 8:
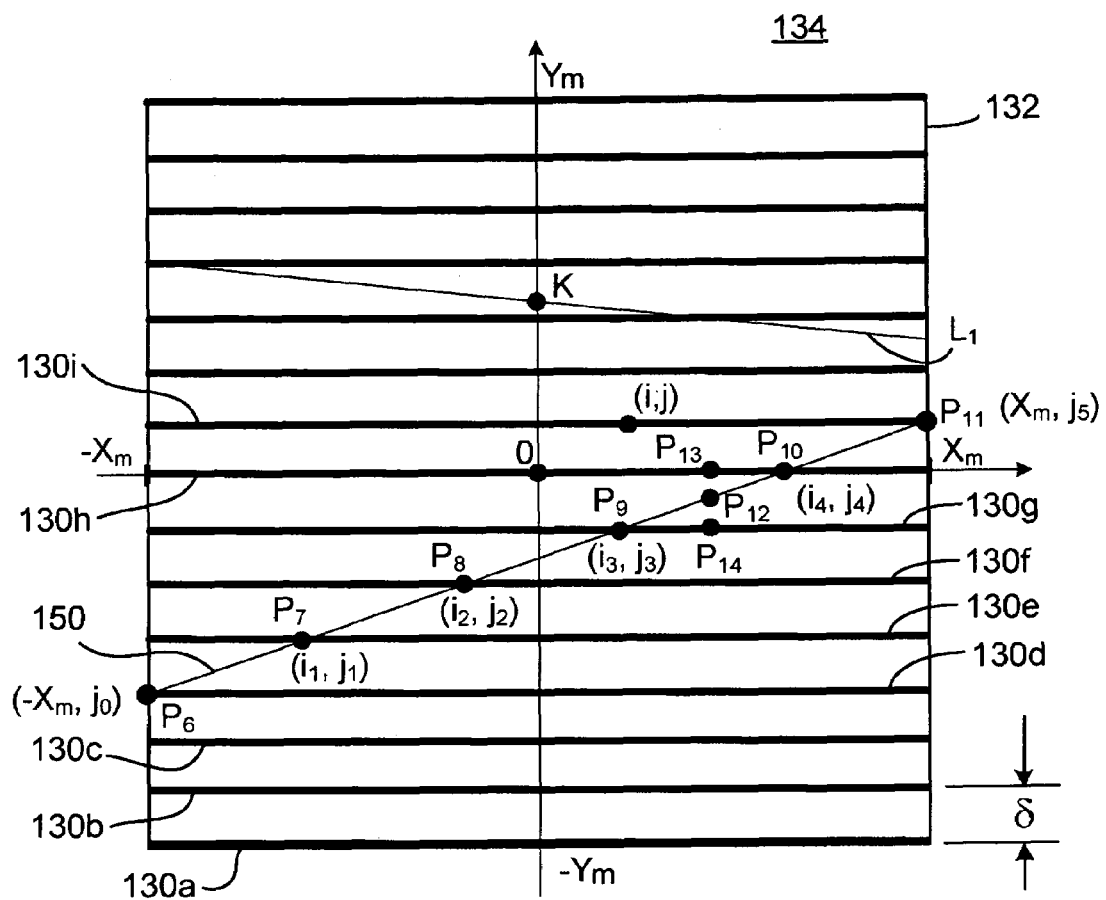
FIG. 8 shows a top view of the view volume in a ray space.

FIG. 8 shows a top view of the view volume 132. Each horizontal line (e.g., 130a to 130i) represents a slice in the view volume 132 and corresponds to an image captured by the camera 120 from a particular position on the observation surface 108. The spacing between the horizontal lines in FIG. 8 is equal to δ.

For convenience of description, the top view of the view volume 132 is said to occupy a "ray space" 134 having a coordinate system in which coordinates on a first axis (X-axis) represent coordinates on the image surface 106, and coordinates on a second axis (Y-axis) represent coordinates on the capture surface. In the ray space 134, the top view of the view volume 132 occupies an area ranging from −Xm to Xm along the X-axis and from −Ym to Ym along the Y-axis. Unless otherwise noted, the description below assumes that the capture surface coincides with the observation surface 108, and thus the coordinates on the second axis (Y-axis) of the ray space 134 also represent coordinates on the observation surface 108.

The ray space 134 can be seen as a dual representation of a 2-D physical space 136 (FIG. 6) that represents a top view of the 3-D physical space in which the multi-view 3-D display 100 physically resides. Each point (i, j) in the ray space 134 corresponds to a line (e.g., 122) in the 2-D physical space 136 that passes a position i on the image surface 106 and a position j on the observation surface 108. Each point (e.g., P9 in FIG. 6) in the 2-D physical space 136 also corresponds to a line (e.g., L1 in FIG. 8) in the ray space 134, in which the slope of the line depends on a distance d between the point P9 and the observation surface 108 (the smaller the distance d the smaller the slope of the line L1), and the Y-axis intercept of the line L1 depends on a position K on the observation surface 108 that is closest to the point P9.

Presentation images are projected from the presentation surface 104 to the image surface 106 to generate the light field of the 3-D object 124. The image screen 124 diffuses the light rays vertically, but does not change the horizontal propagation directions of the light rays.

Figure 9:
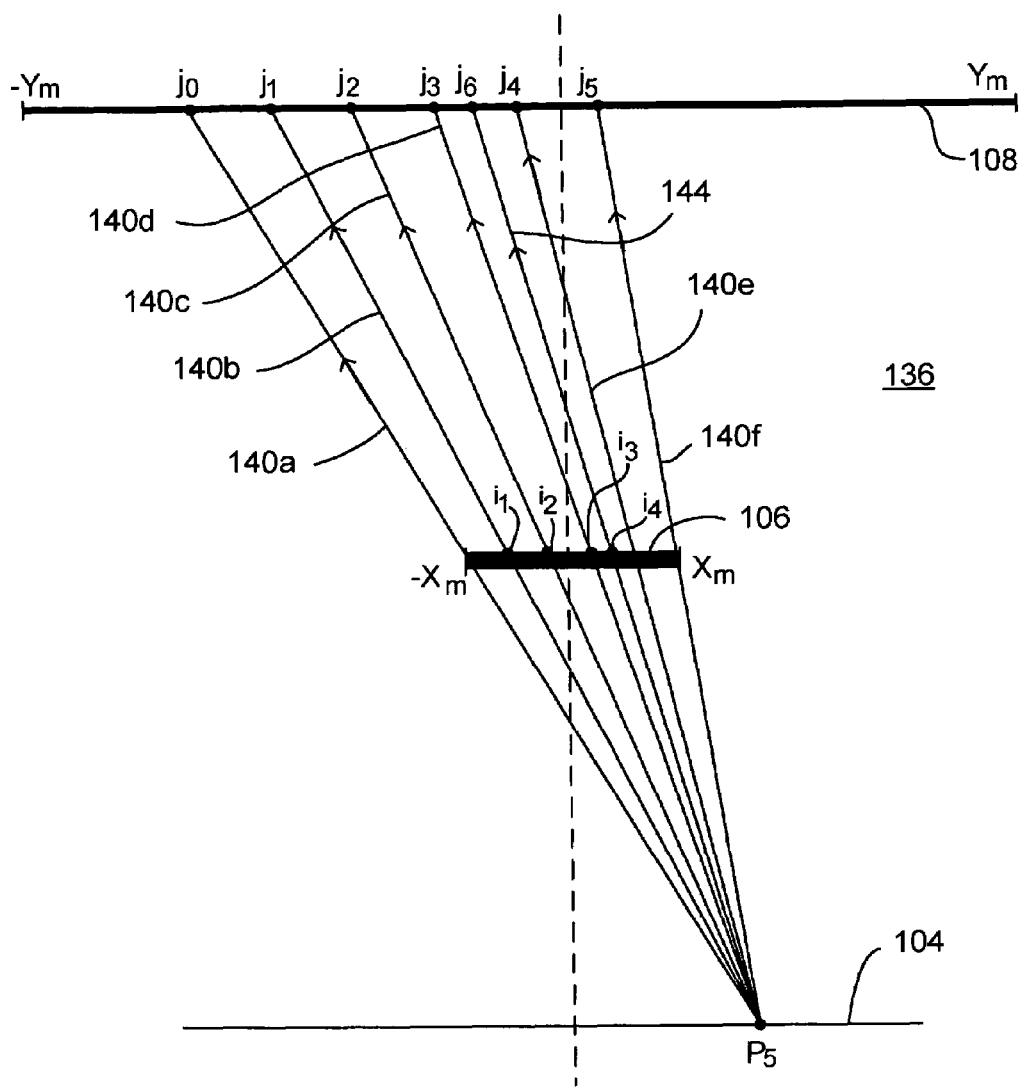
FIGS. 9, 10A, and 11A show rays projected from a point on the presentation surface.

Referring to FIG. 9, data sampled from the view volume 132 can be used to determine the color and brightness of rays projected from a point, such as P5, on the presentation surface 104. The view volume is re-sampled by using calibration surfaces with the appropriate geometry.

The following is an explanation of how the calibration surfaces are generated. Assuming that the capture surface coincides with the observation surface 108, each ray projected from P5 is substantially the same as a ray captured by the camera 120, in which the captured ray and the projected ray propagate along the same path. As previously described, the ray space 134 is a dual representation of the 2-D physical space 136, so each ray in the 2-D physical space 136 corresponds to a point in the ray space 134. Thus, the color and brightness of the rays projected from P5 can be determined by looking up the corresponding points of the view volume 132 in the ray space 134.

As an example, six light rays 140a, 140b, 140c, 140d, 140e, and 140f are projected from the point P5 towards different positions on an upper-most horizontal line of the imaging surface 106. In the 2-D physical space 136, the light ray 140a intersects the imaging surface 106 and the observation surface 108 at positions –Xm and j0, respectively. The light ray 140a corresponds to a point P6 (see FIGS. 7 and 8) of the view volume 132 having a coordinate (–Xm,j0) in the ray space 134. Thus, the color and brightness of the light ray 140a can be determined by the color and brightness represented by the data point P6.

Similarly, light rays 140b, 140c, 140d, 140e, and 140f intersect the imaging surface 106 and observation surface 108 at positions (i1,j1), (i2,j2), (i3,j3), (i4,j4), and (Xm,j5), respectively. The color and brightness of the light rays 140b, 140c, 140d, 140e, and 140f can be determined by the data points P7, P8, P9, P10, and P11 (see FIGS. 7 and 8) of the view volume 132, which have coordinates (i1,j1), (i2,j2), (i3,j3), (i4,j4), and (Xm,j5), respectively, in the ray space 134.

Light rays that propagate along paths that are vertically aligned with the ray 140a will correspond to points along a vertical line 142a of the view volume 132 (see FIG. 7) that is vertically aligned with P6. Similarly, light rays that propagate along paths that are vertically aligned with the rays 140b, 140c, 140d, 140e, and 140f will correspond to points along vertical lines 142b, 142c, 142d, 142e, and 142f, respectively, of the view volume 132 (see FIG. 7) that are vertically aligned with P7, P8, P9, P10, and P11, respectively.

In the above discussion of the rays 140a to 140f and the points P6 to P11, it is assumed that the light rays 140a to 140f intersect the observation surface 108 at positions j0 to j5 that coincide with positions at which the camera 120 captured images of the object 124. If a ray 144 to be projected from the presentation surface 104 were to intersect the observation surface 108 at a position j6 at which no image had been captured by the camera 120, the color and brightness of the ray 144 could be obtained by interpolating data from images taken from nearby positions. For example, the ray 144 in FIG. 9 corresponds to point P12 in FIG. 8, whose color and brightness values can be obtained from an interpolation of respective values of points P13 and P14 in nearby images 130g and 130h, respectively.

The light rays of a presentation image to be projected from a particular point on the presentation surface 104 correspond to points on a "calibration surface" 150 that intersects the view volume 132 (see FIG. 7). When the image surface 106 and the observation surface 108 are represented by straight lines in the 2-D physical space 136, the calibration surface 150 will be represented by a straight line in the ray space 134 (see FIG. 8), and represented by a flat surface in the view volume 132 (see FIG. 7). The calibration surface 150 is skewed with respect to the images (e.g., 130a to 130i) by an amount dependent on the relative positions of the observation surface 108, the image surface 106, and the presentation surface 104, and the relative sizes of the observation surface 108 and the image surface 106.

When one or both of the image surface 106 and the observation surface 108 are represented by curved lines in the 2-D physical space 136 (such as in the example of FIG. 3C), the calibration surface 150 may be represented by a curved line (not shown) in the ray space 134 (FIG. 8), and represented by a curved surface (not shown) in the view volume 132 (FIG. 7).

In one example, the size of the observation surface 108 is determined by the presentation surface 104 and the image surface 106. The range of the light rays projected from the presentation surface 104 onto the image surface 106 defines the range of the observation surface 108 (i.e., an observer can see the 3-D image of the object 124 only if he can receive the rays from the presentation surface 104). For a given geometry of the presentation surface 104, the image surface 106, and the observation surface 108, and their relative positions, a transformation matrix can be used to determine the calibration surface for a particular position on the presentation surface 104.

Figure 10A:
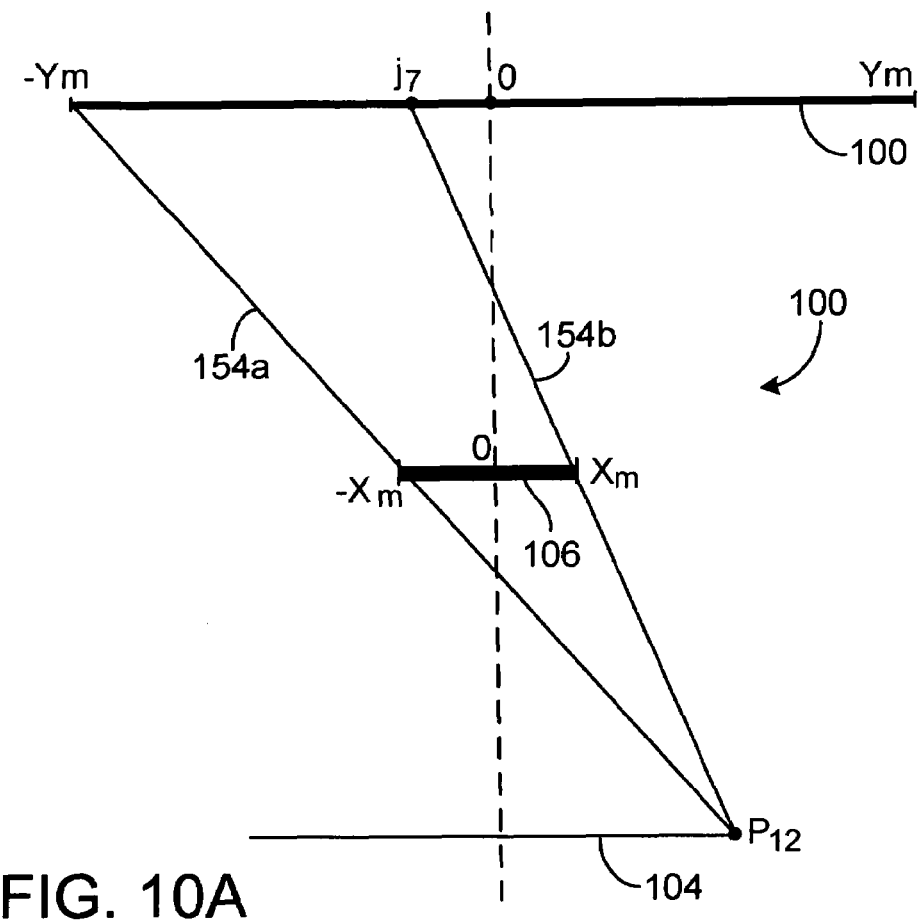
Figure 10B:
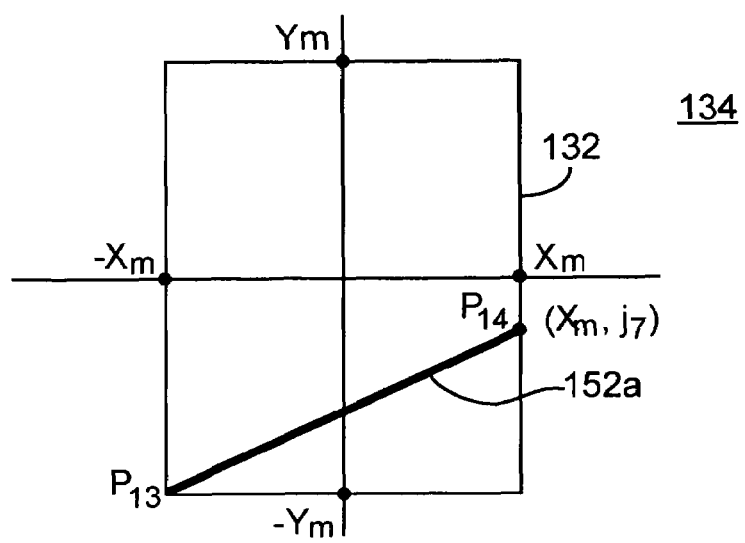
FIGS. 10B and 11B show points in the ray space that correspond to rays in FIGS. 10A and 11B.

For example, for a given configuration of the 3-D display 100 as shown in FIG. 10A, a point P12 at the right edge of the presentation surface 104 generates a presentation image that maps to the range of positions –Xm to Xm on the image surface 106, and to the range of positions –Ym to j7 on the observation surface 108. A light ray 154a that passes positions –Xm and –Ym on the image surface 106 and observation surface 108, respectively, corresponds to a point P13 in the ray space 134, as shown in FIG. 10B. A light ray 154b that passes positions Xm and j7 on the image surface 106 and the observation surface 108, respectively, corresponds to a point P14 in the ray space 134. All other rays projected from P12 correspond to points on a line 152a that connects points P13 and P14 in the ray space 134. Thus, the calibration surface that corresponds to the point P12 on the presentation surface 104 is represented by the line 152a.

Figure 11A:
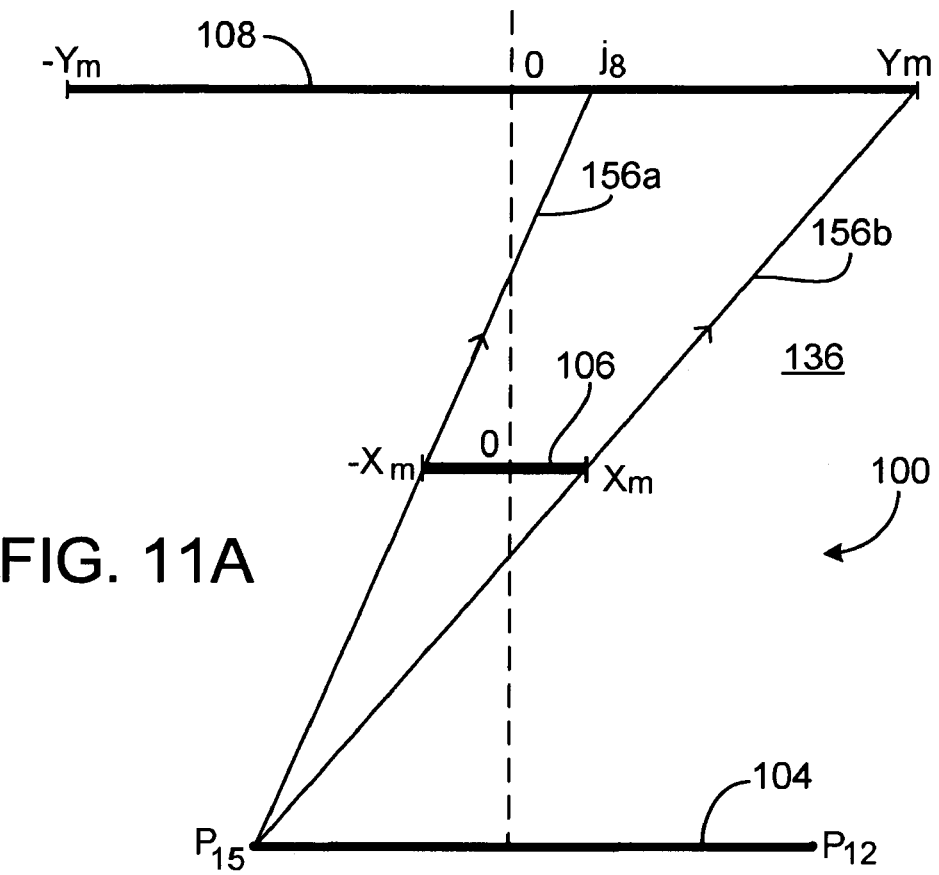
Figure 11B:
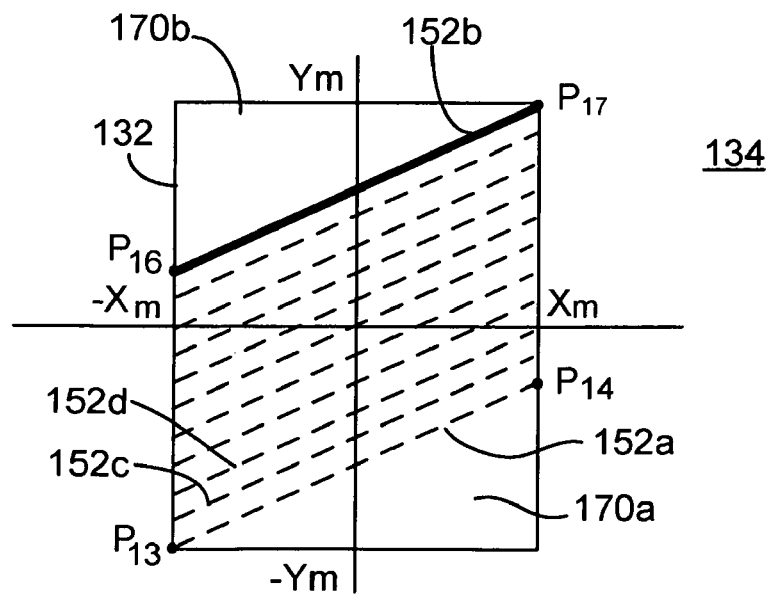

Referring to FIG. 11A, a point P15 at the left edge generates a presentation image that maps to the range of positions –Xm to Xm on the image surface 106, and to the range of positions j8 to Ym on the observation surface 108. A light ray 156a that passes positions –Xm and j8 on the image surface 106 and observation surface 108, respectively, corresponds to a point P16 in the ray space 134, as shown in FIG. 11B. A light ray 156b that passes positions Xm and Ym on the image surface 106 and the observation surface 108, respectively, corresponds to a point P17 in the ray space 134. All other rays projected from P15 correspond to points on a line 152b that connects points P16 and P17 in the ray space 134. Thus, the calibration surface that corresponds to the point P15 on the presentation surface 104 is represented by the line 152b.

Similarly, points between P12 and P15 on the presentation surface 104 maps to calibration surfaces that are represented by lines parallel to and between the lines 152a and 152b, such as lines 152c and 152d. The spacing between calibration surfaces in the view volume 132 is proportional to the spacing between positions on the presentation surface 104 at which the presentation images are projected. Each calibration surface is used to generate a presentation image, which is loaded onto a SLM 102 (such as a DMD) for display.

The following is a description on how to map a point or a line in the 2-D physical space 136 to a line or a point, respectively, in the ray space 134.

Figure 12A:
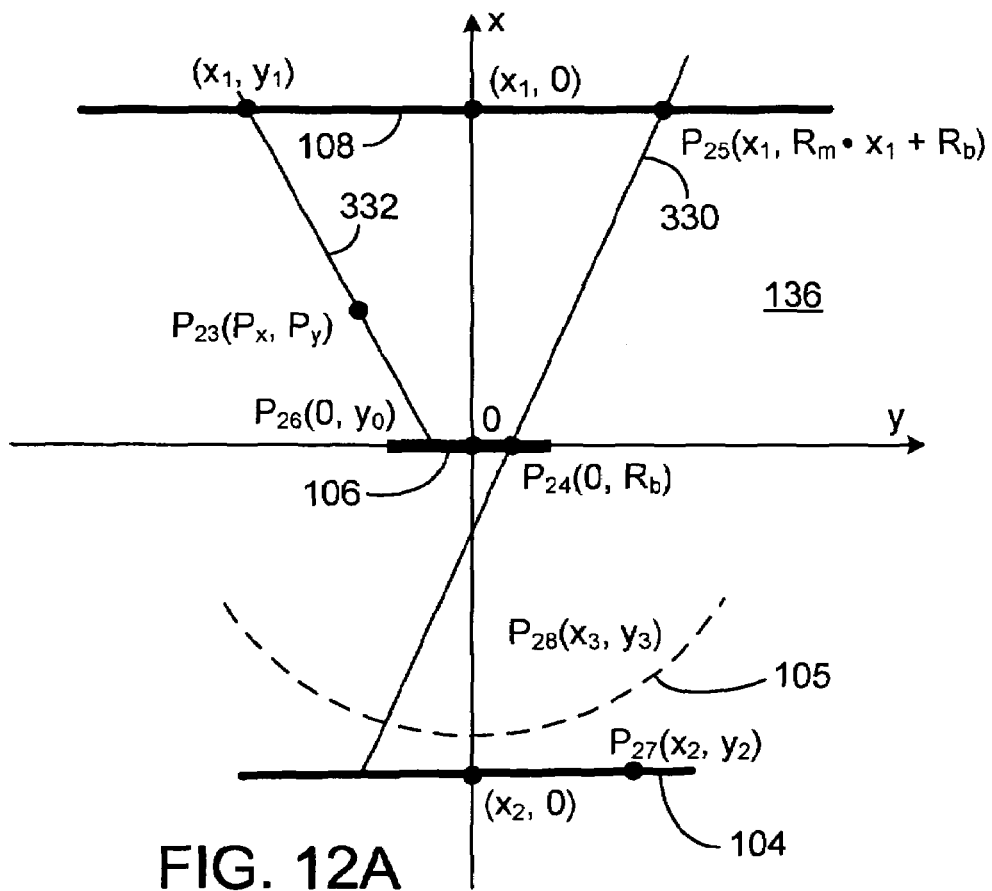
FIGS. 12A, 12B, and 12C show mappings between a physical space and a ray space.

Referring to FIG. 12A, assume that the 2-D physical space 136 has orthogonal x- and y-axes, the image surface 106 is parallel to the y-axis (i.e., x=0), the observation surface 108 is parallel to the line $x=x_1$, and the presentation surface 104 is parallel to the line $x=x_2$. Also, assume that the image surface 106 and the observation surface 108 are symmetric with respect to the x-axis (i.e., y=0).

Figure 12B:
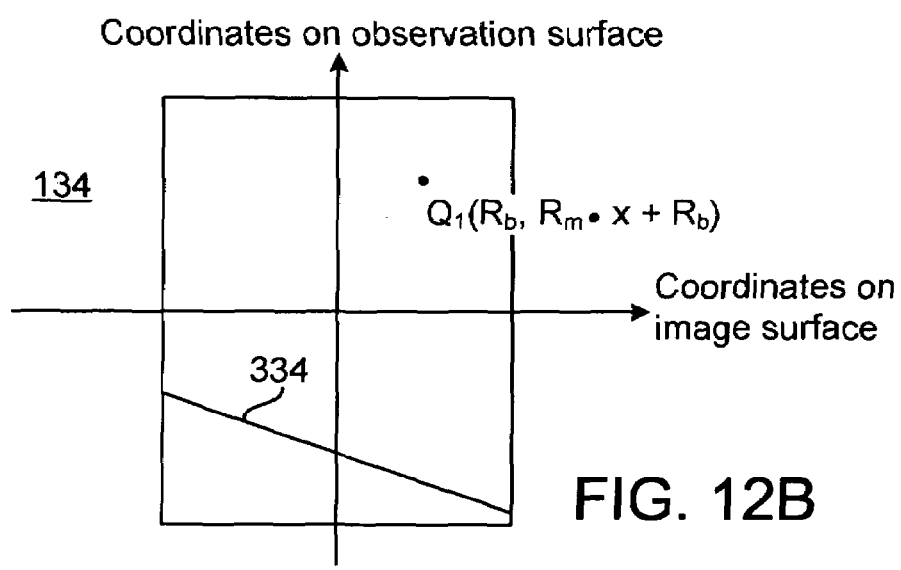

A line 330 in the 2-D physical space 136 maps to a point Q1 in ray space 134 (see FIG. 12B). Assume the line 330 is represented by the equation $$y = R_m \times x + R_b.$$

The line 330 intersects the image surface 106 at a point P24 (0, $R_b$), and intersects the observation surface 108 at a point P25 ($x_1$, $R_m \times x_1 + R_b$). The x coordinates of the intersection points P24 and P25 are fixed at 0 and $x_1$, respectively. The point Q1 in the ray space 134 has coordinates ($R_b$, $R_m \times x_1 + R_b$).

For a point P23 ($P_x$, $P_y$) in the 2-D physical space 136 that does not fall on either the image surface 106 or the observation surface 108, there is a family of lines (e.g., 332) that pass through the point P23 and intersect both the image surface 106 and the observation surface 108. Assume that the line 332 intersects the image surface 106 at a point P26 (0, $y_0$), and intersects the observation surface 108 at a point P27 ($x_1$, $y_1$). The coordinate $y_1$ can be determined by using ratios of similar triangles:

$$\frac{P_y - y_0}{y_1 - P_y} = \frac{P_x}{x_1 - P_x}.$$

Solving the above equation results in $$y_1 = \frac{(x_1 - P_x)}{P_x}(P_y - y_0) + P_y. \qquad \text{(Equ. 1)}$$

In the ray space 134, Equ. 1 corresponds to a family of points whose coordinates are $$\left(y_0, \frac{(x_1 - P_x)}{P_x}(P_y - y_0) + P_y\right),$$

where $y_0$ ranges from −Ym to Ym on the image surface 106. Because the two coordinates $y_0$ and $y_1$ are linearly related, the family of points in the ray space 134 form a line 334.

Using the method described above, each point P27 ($x_2$, $y_2$) on the presentation surface 104 corresponds to a line in the ray space 134 that includes the points having coordinates $$\left(y_0, \frac{(x_1 - x_2)}{x_2}(y_2 - y_0) + y_2\right), \qquad \text{(Equ. 2)}$$

where $y_0$ ranges from −Ym to Ym. The line corresponds to a calibration surface that can be used to sample the view volume 132 to determine a presentation image to be projected from the point P27 ($x_2$, $y_2$).

As seen from Equ. 2, when the distance $x_1$ (between the surfaces 106 and 108) or the distance $x_2$ (between surfaces 104 and 106) changes, the calibration surface also changes, indicating that the sampling of the view volume 132 depends on the distances $x_1$ and $x_2$.

The slope of the line 334 is equal to $$\frac{P_x - x_1}{P_x}.$$

When $P_x > 0$, the slope is negative, and conversely, when $P_x < 0$, the slope is positive. For points P27 ($x_2$, $y_2$) on the straight image surface 104 that is parallel to the y-axis, different points have the same $x_2$ coordinate but different $y_2$ coordinates. These points correspond to a family of lines in the ray space 134 whose slopes are all equal to $$\frac{x_2 - x_1}{x_2}.$$

Figure 12C:
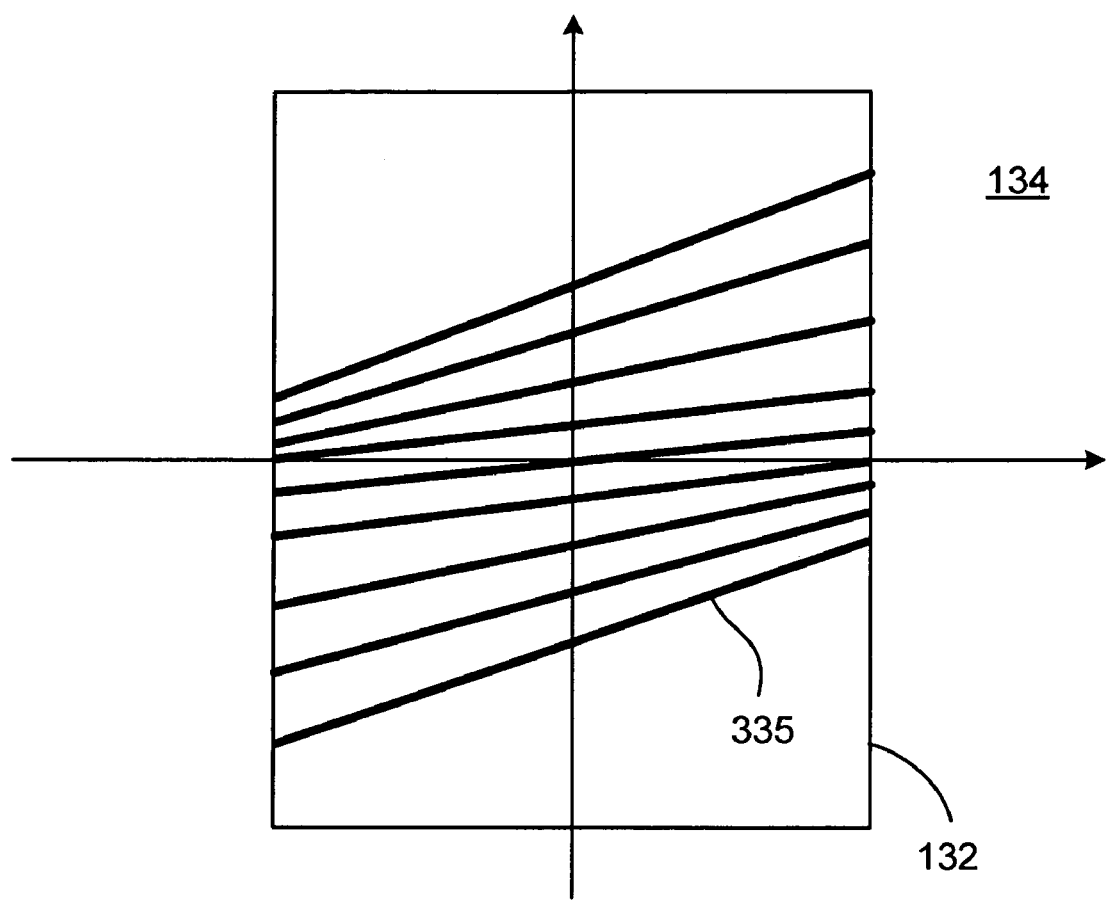

For points P28 ($x_3$, $y_3$) on a curved surface 105, $x_3$ varies when $y_3$ varies, thus the slopes of the corresponding lines in the ray space 134 also change. FIG. 12C shows a family of lines 335 that correspond to the points P28 on the curved surface 105, in which the lines 335 have different slopes (the figure is not to scale). Each line 335 corresponds to a calibration surface that can be used to sample the view volume 132 to determine a presentation image to be projected from a point ($x_3$, $y_3$) on the surface 105.

In the description above regarding how the calibration surfaces are determined, it is assumed that the presentation images projected from the presentation surface 104 reproduce the light field of the 3-D object captured by the camera 120. The calibration surfaces can also be sampled from the view volume 132 in different ways to produce various effects. For example, to show a 3-D image of the 3-D object 124 from a different perspective (e.g., a closer or farther view of the object 124 than seen by the camera 120), or a 3-D image of the object 124 having a different size, or from a different view angle, a mapping based on the desired visual effect would be applied to the calibration surfaces (e.g., 152a, 152b, 152c, 152d) in FIG. 11B to generate the final calibration surfaces that can be used to produce presentation images that, when projected, will achieve the desired visual effect.

Figure 13:
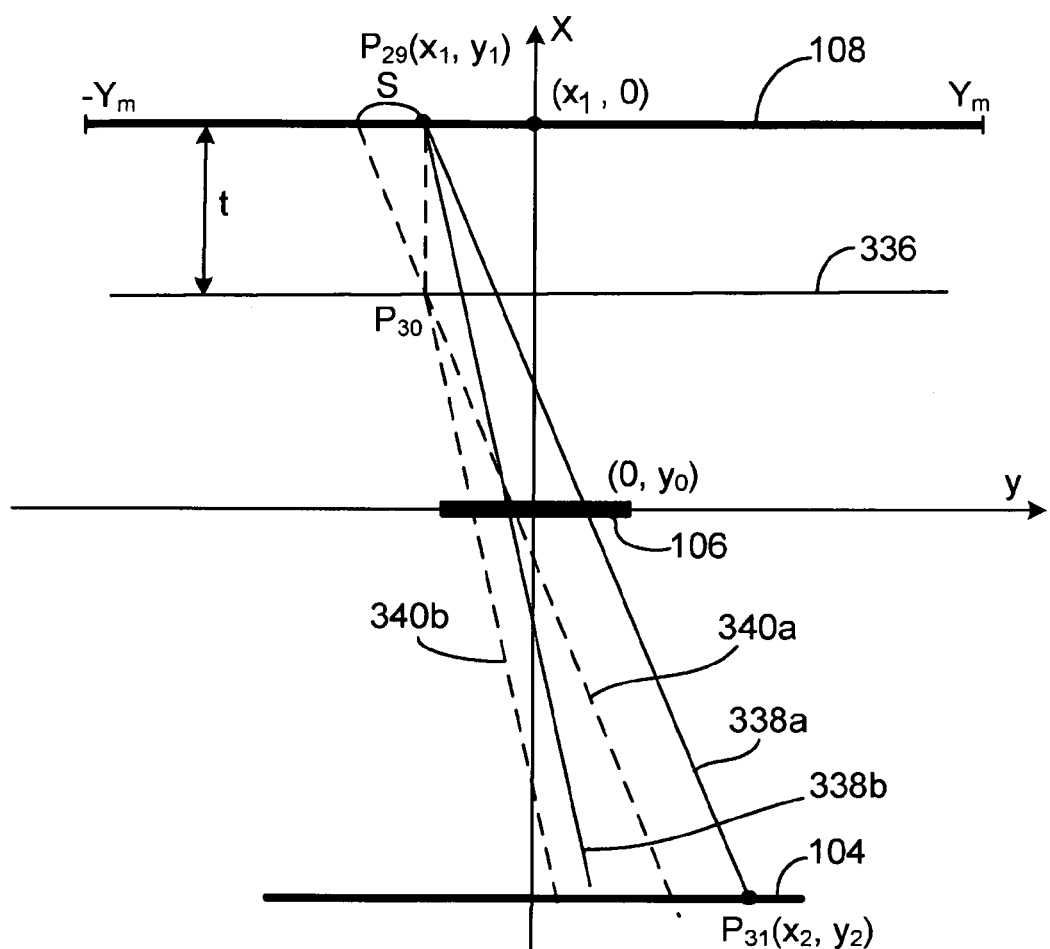
FIG. 13 shows light rays observed from a position on the observation surface.

The following describes an example of showing 3-D images having a perspective different from the images that were captured or synthesized. Referring to FIG. 13, assume that the capture surface coincides with the observation surface 108, and that an observer at a point P29 at the observation surface 108 wishes to see an image of the 3-D object 124 from a perspective of a point P30 on a "virtual observation surface" 336 that is closer to the object 124. The distance between the observation surface 108 and the virtual observation surface 336 is t. To achieve this visual effect, the rays, e.g., 338a and 338b, that are seen by the observer at point P29 should the same as the rays, e.g., 340a and 340b, that are seen from a point P30 on the virtual observation surface 336, in which the rays 340a and 340b are parallel to the rays 338a and 338b, respectively.

The rays projected from a point P31 ($x_2$, $y_2$) on the presentation surface 104 can be determined as follows. The ray 338a projected from P31 intersects the image surface at (0, $y_0$) and the observation surface 108 at ($x_1$, $y_1$), and corresponds to the point $$\left(y_0, \frac{(x_1 - x_2)}{x_2}(y_2 - y_0) + y_2\right)$$

in the ray space 134. Because the ray 338a has a color and brightness that should be the same as those of a ray 340a that was captured by the camera 120, the color and brightness of the ray 338a is determined by a data point in the view volume 132 that corresponds to the ray 340a.

The ray 340a is parallel to the ray 338a, and is shifted by an amount s that can be determined by ratios of similar triangles:

$$s = \frac{y_0 - y_2}{x_2} t,$$

so that the ray 340*a* corresponds to the point $$\left( y_0 - s, \frac{(x_1 - x_2)}{x_2}(y_2 - y_0) + y_2 - s \right)$$

in the ray space 134. In the equations above, s and t are positive values. Thus, the presentation image to be projected from the point P31 (x2, y2) can be determined by sampling the data points in the view volume 132 having coordinates $$\left( y_0 - s, \frac{(x_1 - x_2)}{x_2}(y_2 - y_0) + y_2 - s \right)$$

in the ray space 134, with $y_0$ spanning a range determined by the view volume 132.

The range of y0 depends on the width of the captured (or synthesized) images, and also depends on the range of camera capture positions. Some cropping at wider view angles may occur because the view volume 132 does not have information about the light rays emanating at those wider view angles. In one example, the view volume 132 is constructed to include information about views of the object 124 from view angles wider than can be seen by a viewer under a normal perspective, thereby allowing the user to zoom in or zoom out on the object without too much cropping.

In one example, the camera 120 captures images of the 3-D object 124 from different positions on the virtual observation surface 336, and an observer at the observation surface 108 wishes to see the 3-D object 124 using a perspective that is the same as those captured by the camera 120. To achieve this visual effect, the rays, e.g., 338*a* and 338*b*, that are seen by the observer at point P29 should the same as the rays, e.g., 340*a* and 340*b*, that are seen from a point P30 on the virtual observation surface 336, in which the rays 340*a* and 340*b* are parallel to the rays 338*a* and 338*b*, respectively. The ray 338*a* projected from a point P31 (x2, y2) on the presentation surface 104 would have the same color and brightness as a ray 340*a*, which corresponds to a point having coordinates $$\left( y_0 - s, \frac{(x_1 - x_2)}{x_2}(y_2 - y_0) + y_2 \right),$$

in the ray space 134, in which $$s = \frac{y_0 - y_2}{x_2} t.$$

Note that the vertical axis of the ray space 134 represents coordinates of the capture surface, which in this case is the virtual observation surface 336.

The view volume 132 is sampled with a sampling rate that is sufficiently high to prevent aliasing of images. For an example of how a minimum sampling rate can be determined, see "Plenoptic Sampling," by Jin-Xiang Chai, et al., Proceedings of the 27$^{th}$ Annual Conference on Computer Graphics and Interactive Techniques, 2000, pages 307-318, the contents of which are incorporated herein by reference.

In one example, the projection data are generated by a graphics processing unit (GPU) that uses 32 bits to store information about a pixel, in which 8 bits are used for each of four color channels (red, green, blue, and alpha). The data from the four color channels are used to control three separate spatial light modulators (SLMs) that modulate red, blue, and green light to produce a full-color image.

In one example, each SLM is a DMD, a 1-bit per pixel SLM that has an array of micromirrors, each of which switches between an on position that generates a bright pixel and an off position that generates a dark pixel. For each pixel, a DMD can receive a number between 0 and 1, representing different shades of brightness ranging from dark (0) to totally bright (1). The different shades of gray are generated by the switching the micromirror to the on position for different periods of time.

In an alternative example, rather than representing gray scale by turning on the pixels for different time periods, a halftoning process is used to convert the high-color-precision presentation images to low-color-precision images. In one example, known as "uniform thresholding," halftoning of an image is performed by comparing each pixel in the image with a threshold value. In another example, known as "ordered dithering," a better image quality is achieved by using different threshold values for different pixels. In ordered dithering, the output value of each pixel is independent of other pixels. This allows a GPU to halftone the pixels in parallel.

There are two types of dither matrices: clustered dot dither matrices and dispersed dot dither matrices. Clustered dot dither matrices concentrate thresholds of like value, so that nearby pixels have similar threshold values. Dispersed dot dither matrices spread thresholds of like value, so that nearby pixels have dissimilar values. Examples of dispersed dot dither matrices include Bayer's dither matrices, as discussed in page 12 of "Image Quantization, Halftoning, and Dithering," by Thomas Funkhouser, Princeton University, fall of 2000.

Halftoning an image has the advantage of allowing the DMD to render the image faster. This enables the DMD to project different presentation images from multiple locations in a time-division-multiplexed manner.

Figure 14:
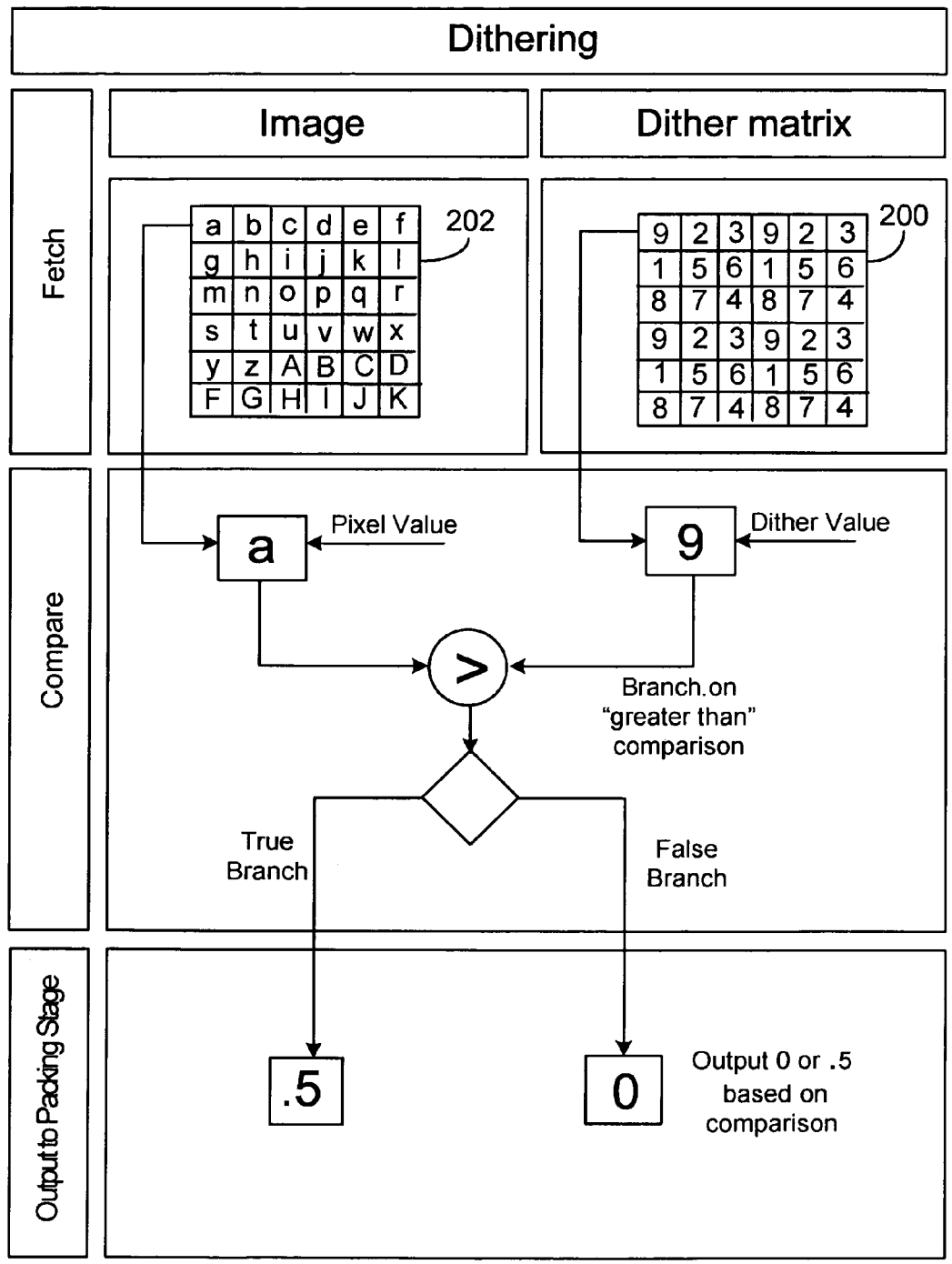
FIG. 14 shows a process for dithering an image.

FIG. 14 shows a process for dithering an image 202 by using a dither matrix 200. The dither matrix 200 is loaded into the GPU as a 2-D texture, referred to as the dither texture. The GPU is configured so that texture filtering is disabled, and that both horizontal and vertical texture coordinate wrap modes are set to repeat. This allows the smaller dither matrix 200 to be repeatedly used to cover the entirety of the larger source image 202.

Because three DMDs are used to process the red, green, and blue components of the image, each of the color components in the image are dithered using the same dither matrix 200. For example, the red color value in each pixel of the source image 202 is compared with a corresponding pixel value in the dither matrix 200. If the red color value (e.g., a) for the pixel in the source image 202 is greater than the dither value (e.g., 9) for the pixel in the dither texture, the red color value for that pixel in the dithered image is 0.5; otherwise, it is 0. This results in a red-color dithered image that has pixel values of either 0.5 or 0. The green and blue components of the source image 202 can be dithered using a similar process.

Figure 15:
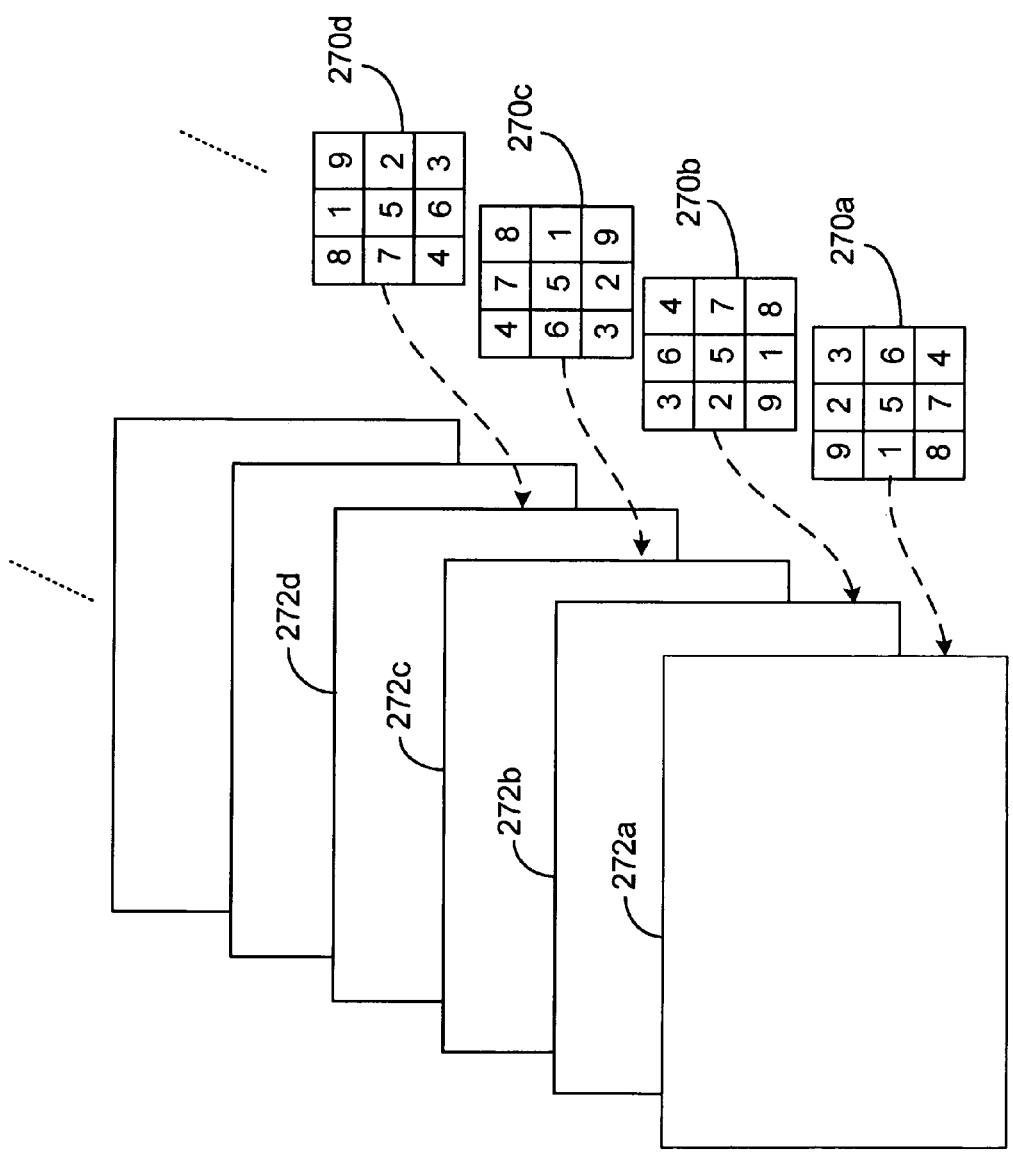
FIG. 15 shows dither matrices.

Referring to FIG. 15, in one example, presentation images 272a, 272b, 272c, and 272d are intended to be projected from adjacent positions on the presentation surface 104. To hide the periodicity of the dither texture when dithering adjacent presentation images (thus preventing clustering of dots from different presentation images viewed from slightly different angles), a dither kernel is rotated in 90 degree increments to generate de-correlated dither kernels. Rotation of the dither kernel can be efficiently performed by permuting and negating the dither texture coordinates. For example, a dither kernel 270a is used to dither the presentation image 272a. The dither kernel 270a is rotated counterclockwise 90, 180, and 270 degrees to generate dither kernels 270b, 270c, 270d, respectively, which are used to dither presentation images 272b, 272c, and 272d, respectively.

After the dithering process described above, the image data is reduced to either 0.5 or 0 for each pixel for each color component. In 2's complement fixed point notation normalized from the range [0,1], 0.5 maps to a binary number in which only the most significant bit is 1, and the rest are 0. The dithered image data is sparse, including many repeating 0's, and can be compressed using a simple compression algorithm described below. Other compression algorithms can also be used depending on the GPU processing power.

Figure 16:
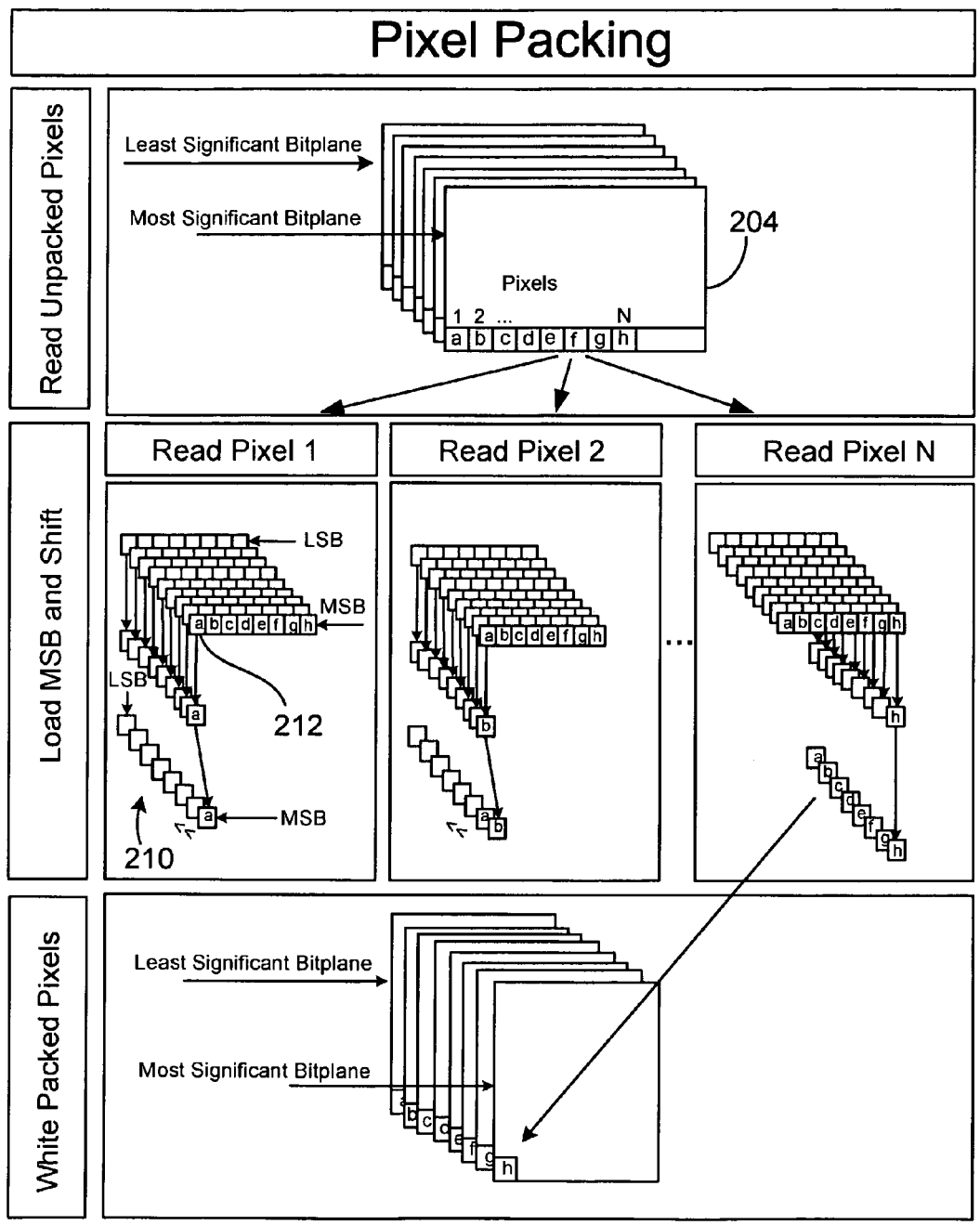
FIG. 16 shows a process for compressing an image.

Referring to FIG. 16, in one example, the GPU compresses each of the red, green, and blue dithered images by packing the most significant bit (MSB) of N adjacent pixels into a single N-bit component. In one example, N equals 8. A register 210, referred to as the shift register, is used to perform the component-wise shift of the MSBs. Initially, the shift register 200 is cleared to zeroes. A halftoned pixel (e.g., 212) is read from a dithered image 204 (red, green, or blue channel) and added to the shift register 210. Because the pixel has non-zero values only in the MSB, adding the pixel value to the value stored in the shift register 210 only affects the MSB of the shift register 210, which is equivalent to copying the MSB of the image pixel into the MSB of the shift register 210. The shift register 210 is right-shifted by multiplying the shift register 210 by 0.5. This process is repeated until N adjacent halftoned pixels are read and packed into the shift register 210. Then, the content of the shift register 210 is stored as the output, which can then be sent from the GPU to the 3-D display 100. Such a packing process reduces the amount of pixel data to 1/N of the original amount.

Figure 17:
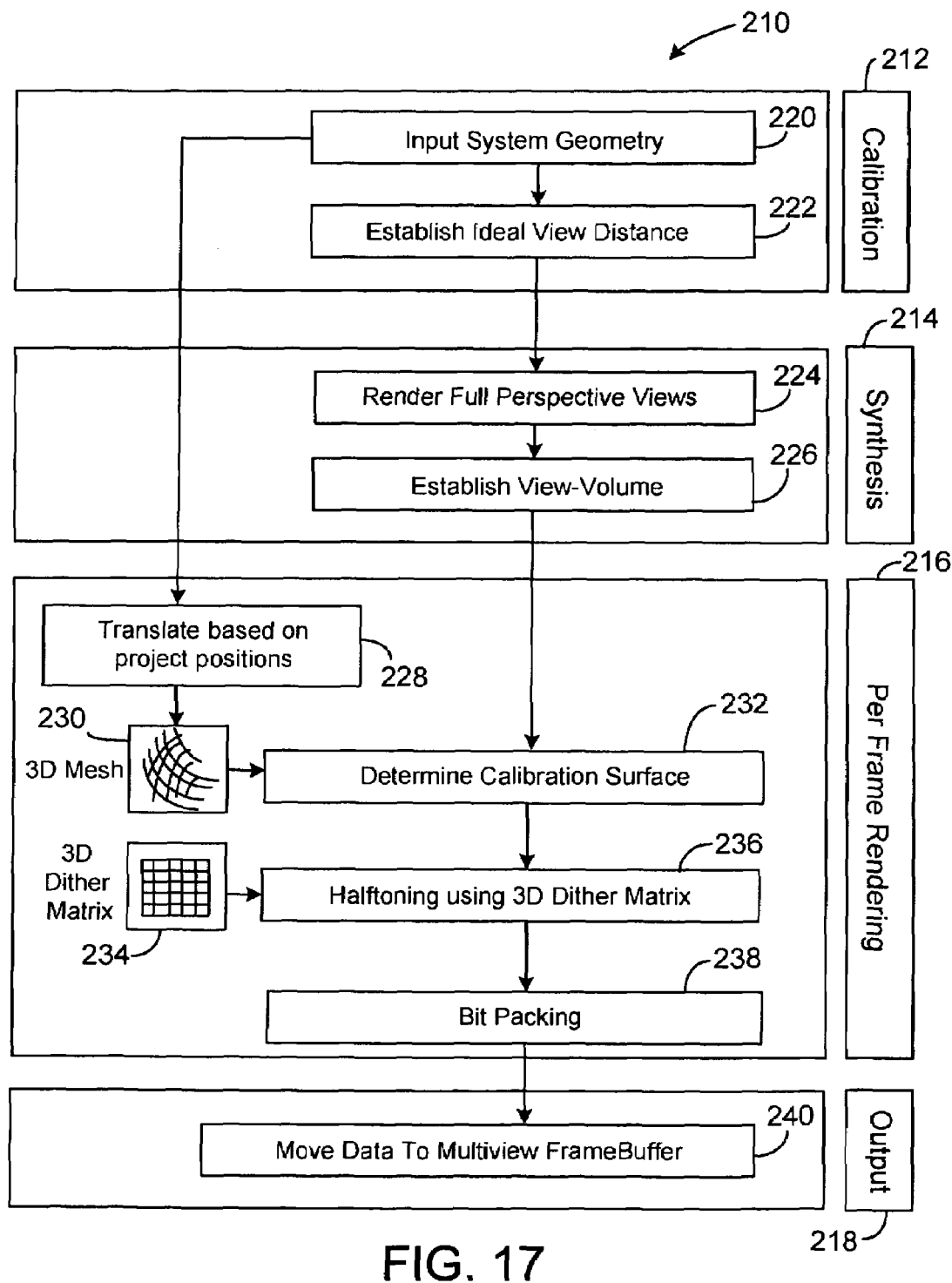
FIG. 17 shows a process for generating presentation images.

FIG. 17 shows a process 210 for generating compressed presentation image data that can be used by a 3-D display 100 to render the light field of a 3-D object 214. The process 210 can be divided into four major steps: calibration step 212, synthesis step 214, per frame rendering step 216, and output step 218. In the calibration step 212, the 3-D display system geometry is determined (step 220). This would include determining the sizes of the presentation surface 104 and the image surface 106, their geometry, and their relative distance. An ideal observation distance is also established (step 222). In the synthesis step 214, the full perspective views, or images, of the 3-D object 124 are rendered (step 224). A view volume 132 is generated (step 226) based on the images that were rendered (step 224).

In the per frame rendering step 216, the position of a calibration surface 150 is translated (step 228) based on the positions at which the presentation images are projected (e.g., when the projection position changes by δ from the previous projection position, the position of the calibration surface 150 within the view volume 132 changes by an amount proportional to δ). The shape (represented by a 3-D mesh 230) of the calibration surface 150 is determined based on one or more physical parameters of the 3-D display 100. The 3-D mesh 230 is used to draw (step 232) the calibration surfaces 150 to re-sample the view volume 132. A 3-D dither matrix is generated (step 234), and halftoning (step 236) of the re-sampled image is performed using the 3-D dither matrix. The 3-D dither matrix can be implemented by using a 2-D dither matrix that is rotated by 90 degrees when applied to adjacent presentation images. The dithered image is bit-packed packed (step 238) to reduce the data rate. In the output step 218, the bit-packed data are moved (step 240) to a frame buffer of the 3-D display 100.

Figures 18A, 18B, 18C:
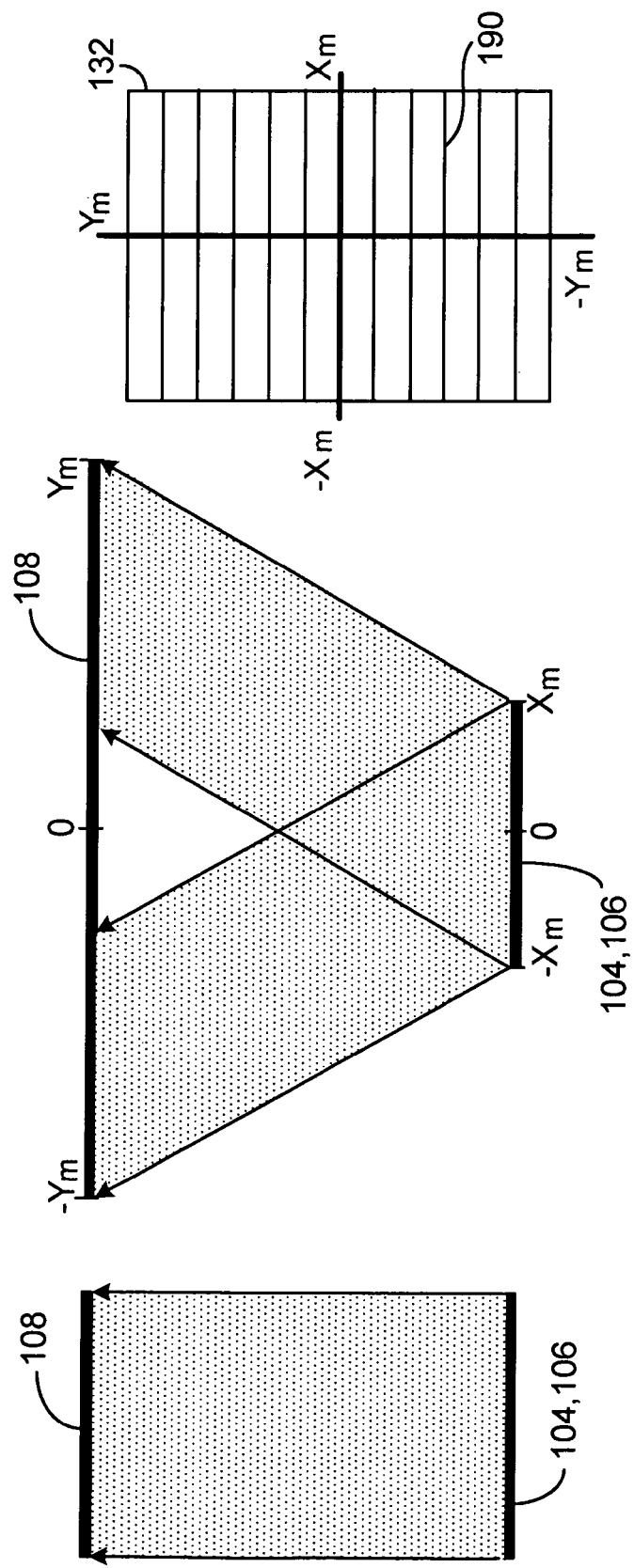
FIGS. 18A and 18B show side and top views of a 3-D display.
FIG. 18C shows calibration surfaces that correspond to the 3-D display of FIGS. 18A and 18B.

FIGS. 3A-6, 9, 10A and 11A show pseudoscopic 3-D displays 100. Other types of 3-D display configurations can be used. For example, FIGS. 18A and 18B show a side view and a top view, respectively, of an example of an orthoscopic 3-D display. In such a display, the image surface 106 coincides with the presentation surface 104, and the width of the image surface 106 is the same as that of the presentation surface 104. An example of an orthoscopic display is a lenticular display. Referring to FIG. 18C, the calibration surfaces 190 for such a display are parallel to the image slices in the view volume 132.

Figure 19A:
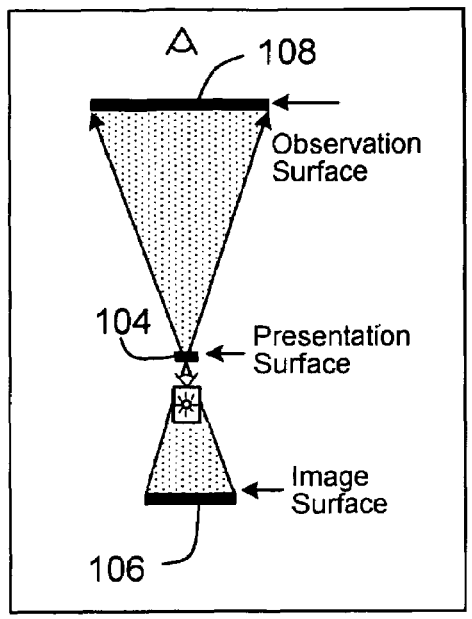
FIGS. 19A and 19B show side and top views of a 3-D display.
Figure 19C:
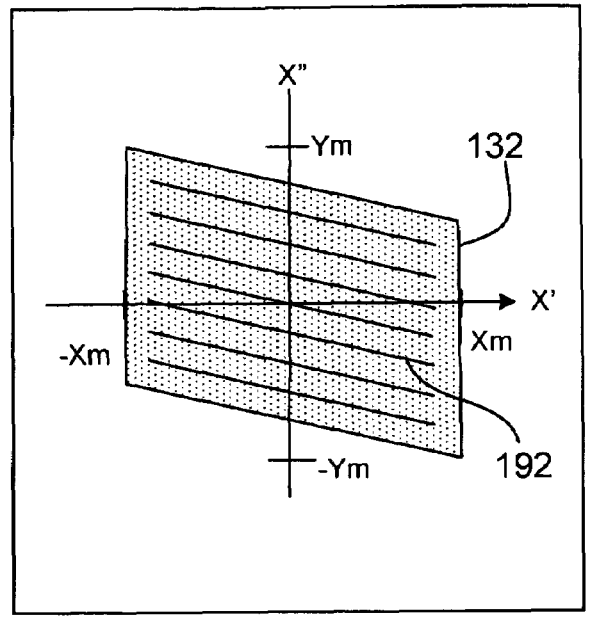
FIG. 19C shows calibration surfaces that correspond to the 3-D display of FIGS. 19A and 19B.
Figure 19B:
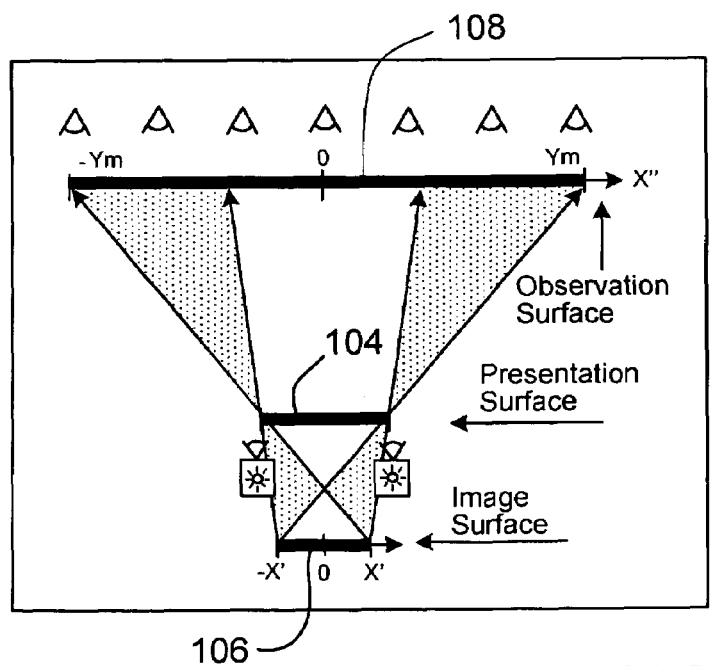

FIGS. 19A and 19B show a side view and a top view, respectively, of an example of an regular perspective 3-D display. In such a display, the presentation surface 104 is positioned between the image surface 106 and the observation surface 108. The width of the presentation surface 108 is significantly smaller than the width of the image surface 106. Referring to FIG. 19C, the calibration surfaces (e.g., 192) for such a display are skewed with respect to the image slices in the view volume 132.

Figure 20A:
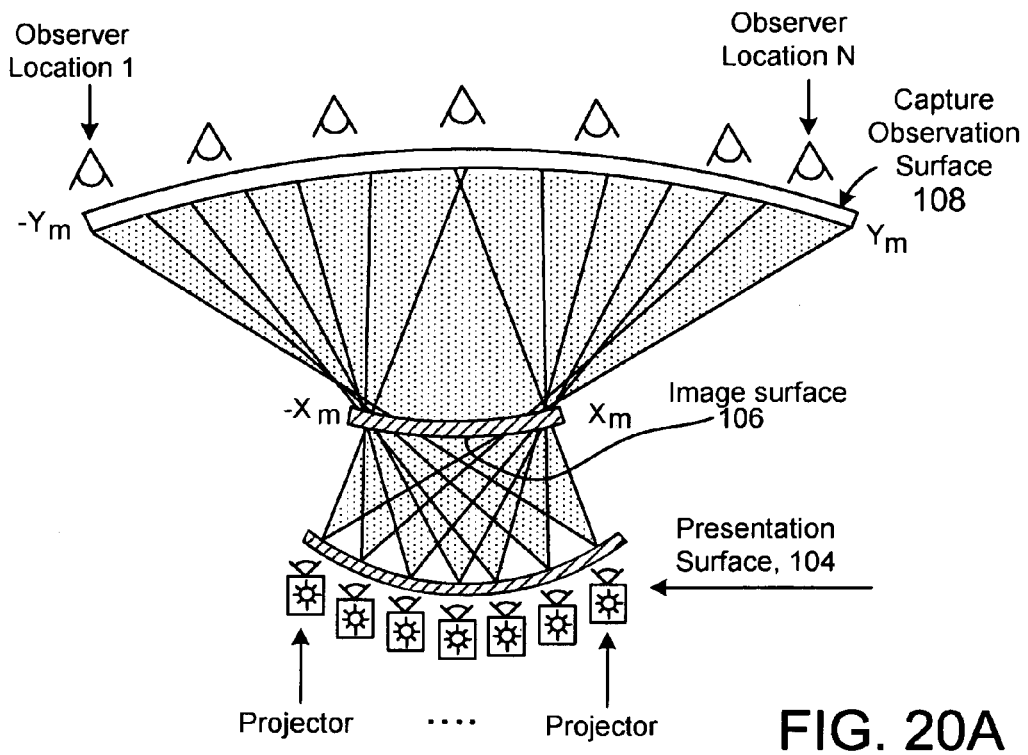
FIG. 20A shows a top view of a 3-D display.
Figure 20B:
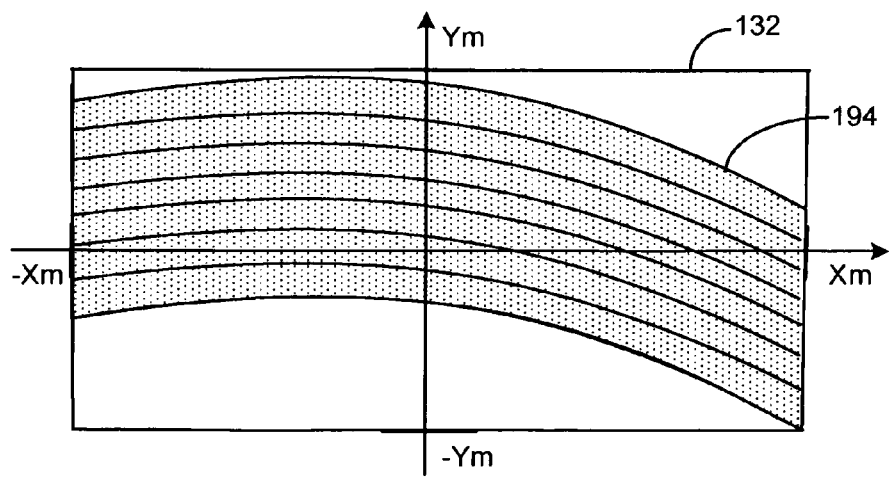
FIG. 20B shows calibration surfaces that correspond to the 3-D display of FIG. 20A.

FIG. 20A shows a top view of an example of a pseudoscopic 3-D display in which the presentation surface 104, the image surface 106, and the observation surface 108 are curved. Referring to FIG. 20B, the calibration surfaces (e.g., 194) for such a display are curved compared to the image slices in the view volume 132.

In one example, the entire view volume 132 is stored in random access memory so that data points in the view volume 132 can be sampled quickly to generate the presentation images. Saving the entire portion of the view volume 132 that may be sampled by the calibration surfaces 150 is useful when there are multiple SLMs so that the presentation images are projected at the same time.

In an alternative example, in which the presentation images are projected using a time-division-multiplexing, only that portion of the view volume 132 that is necessary to generate a presentation image is rendered and saved in memory. This approach saves memory. In an example in which the image slices of the view volume 132 and the presentation images are all synthesized by the same GPU, rather than waiting for the GPU to render the entire view volume 132 and then resample portions of the view volume 132, the rendering of the image slices and re-sampling of the view volume 132 can be scheduled concurrently to reduce the wait time between synthesis of the first image slice and projection of the first presentation image.

Figure 21C:
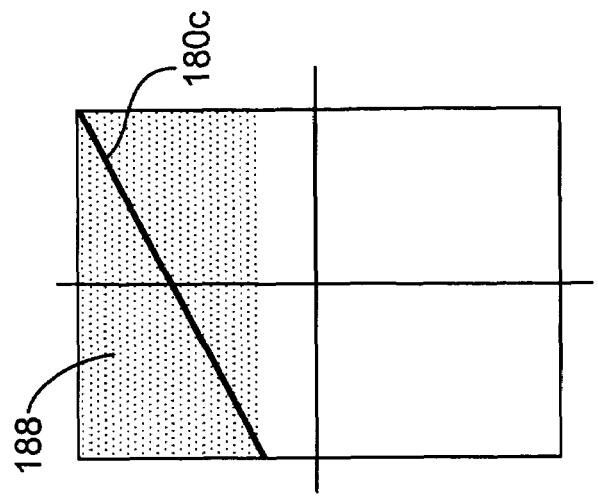
FIGS. 21A to 21C show using different calibration surfaces to sample different portions of a view volume.
Figure 21B:
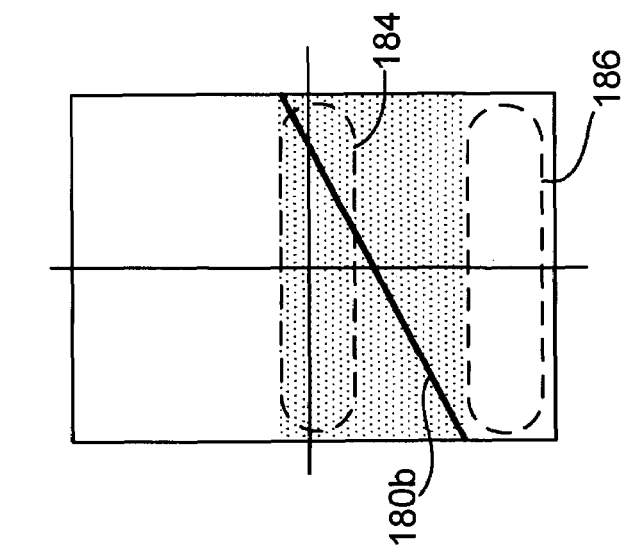
Figure 21A:
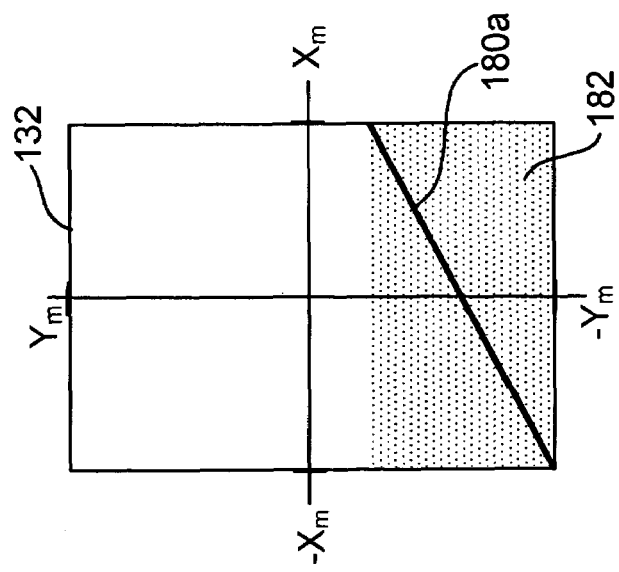

Referring to FIG. 21A, initially, only the shaded portion 182 of the view volume 132 is stored in memory so that a presentation image can be generated by sampling the view volume 132 based on a calibration surface 180a. Referring to FIG. 21B, as time progresses, additional portions (e.g., 184) of the view volume 132 are rendered and stored in memory to generate presentation images by sampling the view volume 132 based on the calibration surfaces 180b, while some portions (e.g., 186) are erased from memory. FIG. 21C shows the portion 188 of the view volume 132 that is stored in memory when the view volume 132 is sampled by a calibration surface 180c.

Figure 22:
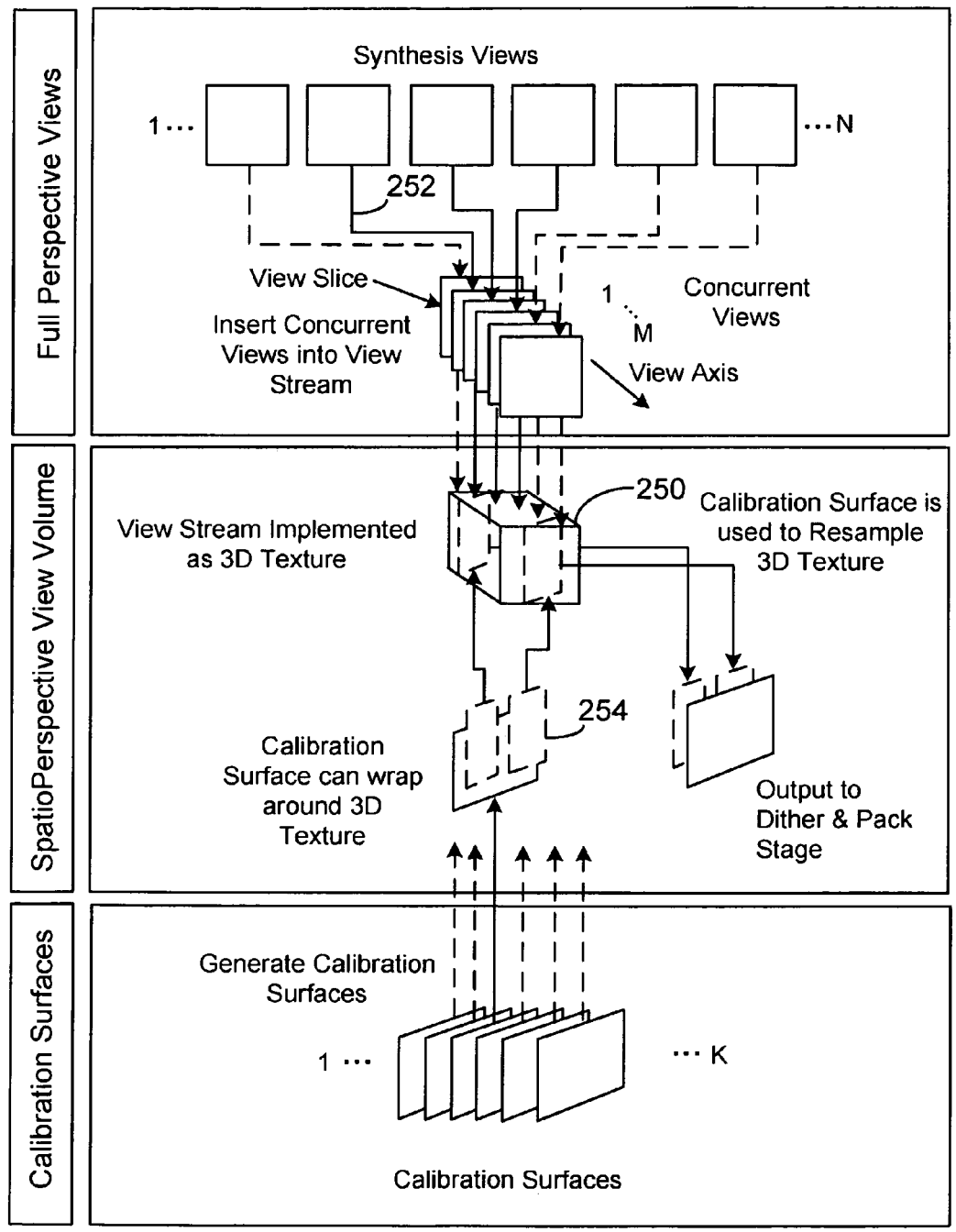
FIG. 22 shows a process for generating projection data using a view stream.

Referring to FIG. 22, the sequentially rendered images of concurrent views of the 3-D object 124 can be sequentially stored in a wrap-around memory buffer 250 of a GPU as a "view stream." The memory buffer 250 is organized into M slices, each slice storing one image that represents a 2-D texture. The sum of the images stored in the memory buffer 250 can be treated as a 3-D texture. The $1^{st}$ to the M-th images are sequentially generated and stored in the $1^{st}$ to M-th slices in the memory buffer 250. The (M+1)-th to 2M-th images are then sequentially generated and stored in the memory buffer 250, overwriting the previous M images, and so forth. The processes of filling the view volume 132 and sampling the view volume 132 to generate the presentation images are scheduled so that enough slices of the view volume 132 are generated to allow the generation of a continuous stream of presentation images.

The image slices are stored in the memory buffer 250 in a wrap-around manner, such that after an image is stored in the M-th slice of the memory buffer 250, the next image is stored in the $1^{st}$ slice of the memory buffer 250. Thus, the calibration surfaces (e.g., 254) sample the 3-D texture stored in the memory buffer 250 by wrapping around borders of the 3-D texture. For example, an n-th calibration surface may sample the (M−1)-th, M-th, $1^{st}$, $2^{nd}$, and $3^{rd}$ slices of the memory buffer 250, an (n+1)th calibration surface may sample the M-th, $1^{st}$, $2^{nd}$, $3^{rd}$, and $4^{th}$ slices of the memory buffer 250, and so forth.

The process described above decouples writing to the view volume 132 from reading from the view volume 132, and is similar to the concept of double buffering in many rendering architectures for 2-D displays. Efficient scheduling can be implemented with this process that allows reading and writing to occur simultaneously within the entire view volume 132. In addition, writing and reading may occur simultaneously within a view stream, as demonstrated in FIG. 22. The solid flow lines (e.g., 252) for synthesized views represent view slices that can be written to at the same time that the calibration surfaces (e.g., 254) are being read.

The number of concurrent captured images or synthesized images does not necessarily have to be the same as the number of slices in the view volume. For example, 100 synthesized images may be generated from 100 different positions on the observation surface 108, but there is only enough resource to process a view volume with 25 image slices. In this example, four images can be combined and stored as one slice in the view volume.

Calibration surfaces can correct distortions in the camera 120 or the projectors. One example of a nonlinear distortion that is typical of optical systems is radial distortion, in which those parts of an image near the center are scaled differently from parts on the periphery. Such distortion can result in pincushion distortion, in which horizontal and vertical lines bend inwards toward the center of the image, or barrel distortion, in which horizontal and vertical lines bend outwards toward the edges of the image.

The calibration surfaces can be adjusted to sample the view volume in a way that offsets the distortions. A feedback system can be designed in which the projectors project presentation images with known patterns. Initially, a known pattern is placed at the image surface 106. The camera 120 captures the known pattern from different positions to establish the view volume 132. Calibration surfaces are determined based on the physical parameters (e.g., geometry and positions of the 3-D display and observation distance, and presentation images are generated and projected from the presentation surface 104. At the image surface 106, if the projected image deviates from the known pattern, then the calibration surfaces are adjusted until the projected presentation images produce the correct image of the known pattern.

Figure 23:
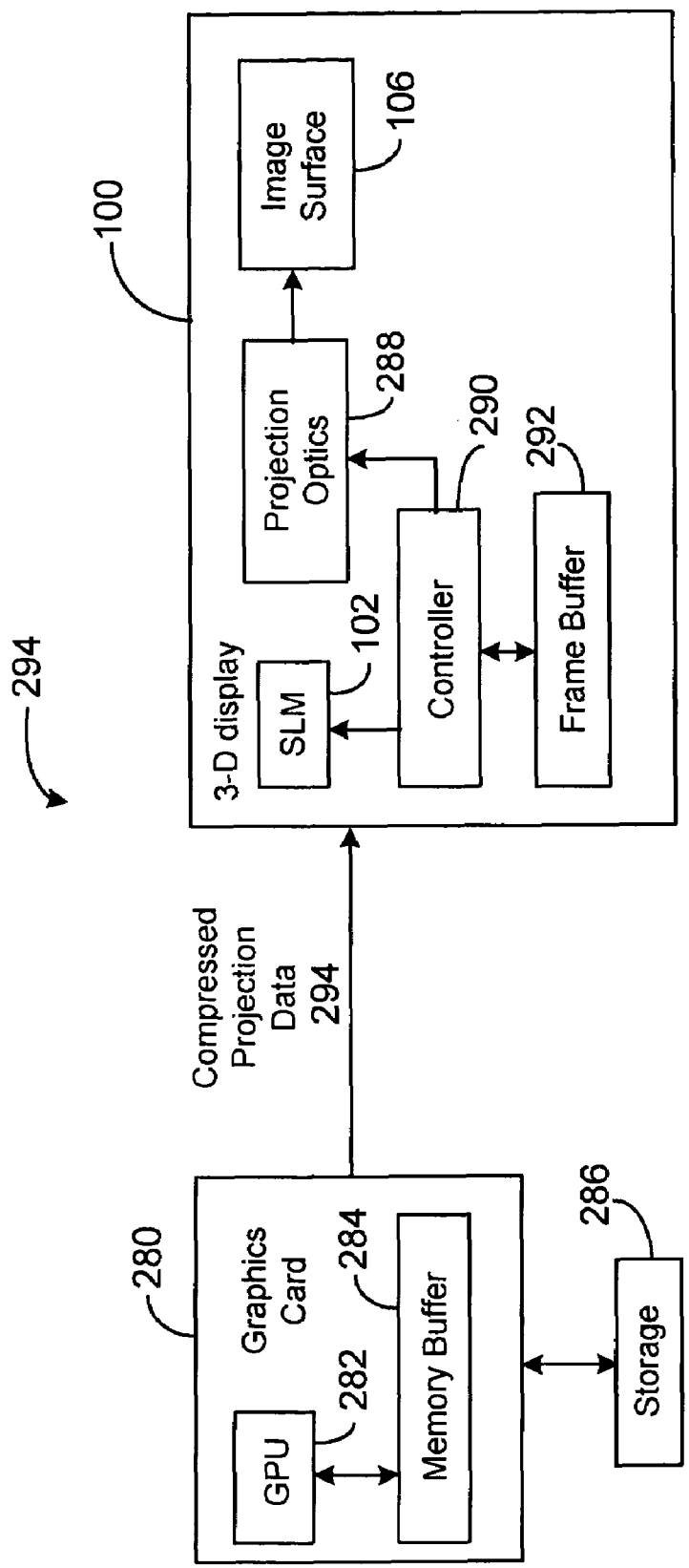
FIG. 23 shows a 3-D display system.

FIG. 23 shows an example of a 3-D display system 294 that includes a front end host 280, a back-end 3-D display 100, and a storage 286. In this example, the host 280 is a graphics card having a GPU 282 and a memory buffer 284. The GPU 282 reads code from the storage 286. This code causes the GPU 282 to implement the process 210 (FIG. 17) for generating compressed presentation image data. Using the process shown in FIG. 22, portions of the view volume 132 are stored in the memory buffer 284 to allow generation of presentation images. The GPU 282 dithers and bit-packs the presentation images using the processes shown in FIGS. 14 and 16, and outputs compressed projection data 294 to the 3-D display 100.

The 3-D display 100 includes a frame buffer 292 that stores the compressed projection data 294. Based on the compressed projection data 294, a controller 290 controls one or more SLMs 102 to modulate light to generate presentation images that are projected by projection optics 288 to an image surface 106. Light rays emanating from the image surface 106 reproduce the light field of a 3-D object 124 to generate a 3-D image of the object 124 that can be observed from different positions to see different aspects of the object 124.

The process of sampling a view volume based on physical parameters of a 3-D display and generating presentation images based on the sampled data allows a view volume to be re-used by different 3-D displays having different system configurations.

Figure 24:
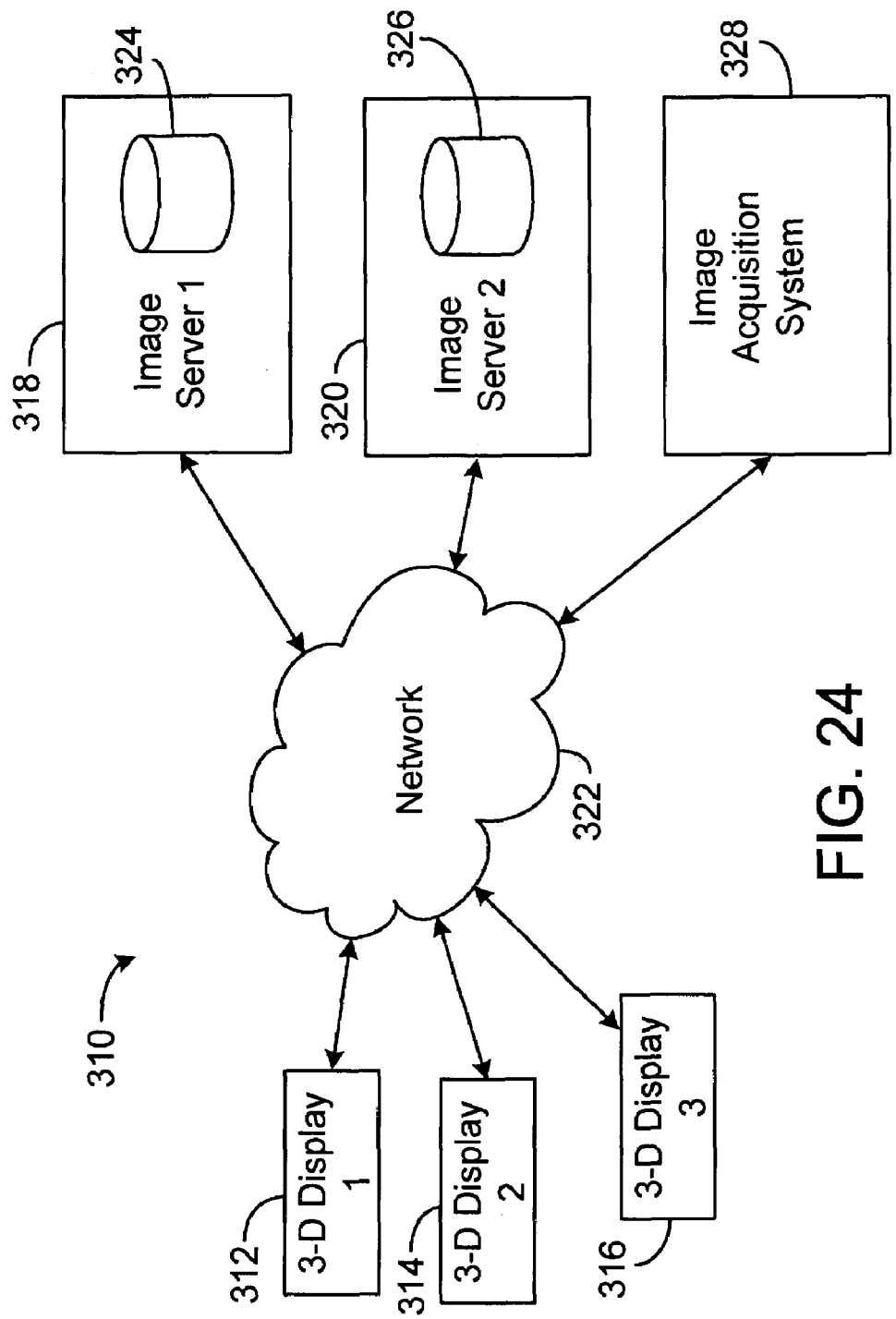
FIG. 24 shows a distributed 3-D display system.

FIG. 24 shows a distributed system 310 for displaying 3-D images of 3-D objects or scenes. In one example, a 3-D display 312 connects to an image server 318 through a high speed network 322. The image server 318 has a storage 324 (e.g., optical or magnetic disk drives) for storing image data associated with a 3-D object or scene. The image data are used to generate view volumes that can be sampled to generate presentation images that, when projected, generates a representation of the light field of the 3-D object or scene, thereby generating a 3-D image of the 3-D object or scene that can be observed from different positions to see different aspects of the object.

For example, the image data in the storage 324 can include images of the 3-D objects captured from different view angles, or synthesized images of the 3-D object. The image data can be derived from computed tomography (CT scans), magnetic resonance imaging, or 3-D laser scanning. The 3-D object can be, e.g., a person, an animal, anatomical structures (e.g., the brain or the heart), a vehicle (e.g., a car or an airplane), components of the vehicle, machinery, consumer products, or an art piece. The 3-D scene can be, e.g., an exterior or interior scene of a house, a building, a manufacturing plant, or a museum. The 3-D object can be an arbitrary collections of points, lines, surfaces, or volumes.

The image server 318 can also store basic information about an object, such as its shape, size, coordinates, and texture, and render synthetic images of the object as needed.

In one example, the 3-D display 312 has limited data processing power, and relies on the image server 318 to generate the presentation images. The 3-D display 312 sends its system configurations, including physical parameters such as the presentation distance, the observation distance, the sizes of the presentation surface and image surface, the positions at which the presentation images are to be projected, the resolution of its spatial light modulator(s), the type of display (e.g., pseudoscopic, orthoscopic, or regular perspective), etc., to the image server 318. The 3-D display 312 requests the presentations images for a particular 3-D object or scene. Based on the system configuration of the 3-D display 312, the image server 318 determines calibration surfaces, samples the view volume based on the calibration surfaces, and generates presentation images using, e.g., the process 210 in FIG. 17. The image server 318 sends the presentation images to the 3-D display 312, which stores the presentation images in a local memory buffer and projects the presentation images to generate a 3-D image of the 3-D object or scene.

The 3-D display 312 may interact with the image server 318 to request the server 318 to send updated presentation images to zoom in, zoom out, or rotate the 3-D object or scene.

In one example, a 3-D display 314 is capable of re-sampling a view volume and generating presentation images associated with a 3-D object or scene. The 3-D display 314 connects to the image server 318, downloads relevant image data, samples the image data based on physical parameters of the 3-D display 314, generates the presentation images, and projects the presentation images to generate the 3-D image of the 3-D object or scene.

In one example, the 3-D display 314 connects to an image acquisition system 328 that includes an array of cameras that capture images of an object or scene in real-time. The captured images are transmitted to the 3-D display 314, which samples the image data based on physical parameters of the 3-D display 314, generates the presentation images, and projects the presentation images to generate a live 3-D image of the object or scene. The live 3-D image can be updated periodically.

In one example, an image server 320 includes a storage 326 that stores image data for generating a 3-D video. The video may include 24 frames per second. The storage 326 stores image data that can be used to generate a view volume for each frame of the 3-D video. Because of similarities among frames, compression algorithms (such as those similar to MPEG algorithm) can be used to compress the image data.

In one example, a 3-D display 316 connects to the image server 320, sends its system configuration to the image server 320, and requests presentation images for a particular 3-D video. In response, the image server 320 generates presentation images for each frame of the video based on the system configuration of the 3-D display 316, and transmits a stream of the presentation images to the 3-D display 316. The 3-D display 316 includes a local buffer for storing the presentation images for a number of frames. The 3-D display 312 projects the presentation images for a current frame of the 3-D video while receiving presentation images for future frames of the video. Alternatively, the 3-D display 312 can store all of the presentation images for all of the frames of the 3-D video locally before beginning to generate the 3-D images.

An advantage of the distributed system 310 is that the 3-D displays 312, 314, and 316 can have different system configurations. For example, the 3-D display 312 may have a lower data processing power, a lower resolution, and a lower cost. The 3-D display 314 may have more data processing power, a higher resolution, and a higher cost. For example, the 3-D display 314 may be used in hospitals to allow doctors to have a 3-D view of a patient's anatomical structures before performing surgery. The 3-D display 316 may have a larger image surface and be used in a theater to allow a large number of viewers to watch a 3-D movie.

An advantage of the distributed system 310 is that one set of image data associated with a 3-D object or scene can be stored at an image server (e.g., 318 or 320) to allow multiple users to show 3-D images of the object or scene. For example, an on-line retailer can store image data for each type of merchandise, so that on-line shoppers having 3-D displays can view 3-D images of the merchandise prior to purchase. Different on-line shoppers can have different 3-D displays with different system configurations.

In one example, the 3-D displays 312, 314, and 316 are used to play a multi-player 3-D computer game. Commands regarding actions of different players are sent to the image server 318, which renders updated scenes in the computer game to reflect the actions of the players, and sends updated presentation images to the 3-D displays 312, 314, and 316 to generate 3-D images of the updated scenes.

Communication devices having 3-D displays can be used transmit 3-D images or 3-D video among users. In one example, a first communication device uses a camera or an array of cameras to capture images of a first user from different positions, generate a view volume based on the captured images, compress the view volume, and send the compressed view volume to a second user. The second user, using a second communication device having a 3-D display, samples the view volume based on the parameters of the 3-D display of the second communication device, generates presentation images, and projects the presentation images to show a 3-D image of the first user. Similarly, the second user can send a compressed view volume to the first user so that the first user can use the 3-D display of the first communication device to show a 3-D image of the second user. The 3-D images can be updated periodically.

In one example, each of the first and second communication devices send information about the system parameters of the 3-D displays, and the view volumes, to an image server. The image server samples the view volumes from the second communication device based on the system parameters of the 3-D display of the first communication device, and vice versa, and generates presentation images for the first and second communication devices.

In one example, the first and second communication devices exchange the system parameters of their 3-D displays. The first communication device, after generating a view volume having images of the first user, samples the view volume based on the system parameters of the 3-D display of the second communication device, generates presentation images, and sends the presentation images to the second communication device. Similarly, the second communication device sends to the first communication device presentation images that are generated by sampling a view volume having images of the second user based on the system parameters of the 3-D display of the first communication device.

The first and second communication devices may have 3-D displays having different system parameters, such as different resolutions, different image surface sizes and shapes, etc. The first and second communication devices can communicate with one another because the view volumes are re-sampled (either locally or remotely, either by the sender or the receiver) based on the particular system parameters of the 3-D displays to generate the presentation images.

The network 322 can be a wide area network, such as the Internet, or a local area network. The network 322 can be wired, wireless, or any combination thereof.

In FIGS. 3A to 5B, the SLMs are located on the presentation surface 104. The spatial light modulator 102 can also be located away from the presentation surface 104. Projection optics may be used to focus the presentation images from the SLM onto the presentation surface 104, so that light rays appear to be projected from a location on the presentation surface 104. An example of such a configuration is shown in FIG. 4 of Provisional Application No. 60/555,602, "Scanned Multiview Three-Dimensional Display," filed Mar. 23, 2004.

It is to be understood that the foregoing description is intended to illustrate and not to limit the scope of the invention, which is defined by the scope of the appended claims. Other embodiments are within the scope of the following claims.

For example, the capture surface does not have to coincide with the observation surface 108. The view volume 132 is first generated by stacking images captured or synthesized from the capture surface. The view volume is then re-scaled so that the view volume 132 occupies the range −Ym to Ym along the Y-axis in the ray space 134, where −Ym and Ym are the ranges of the observation surface 108.

Figure 25:
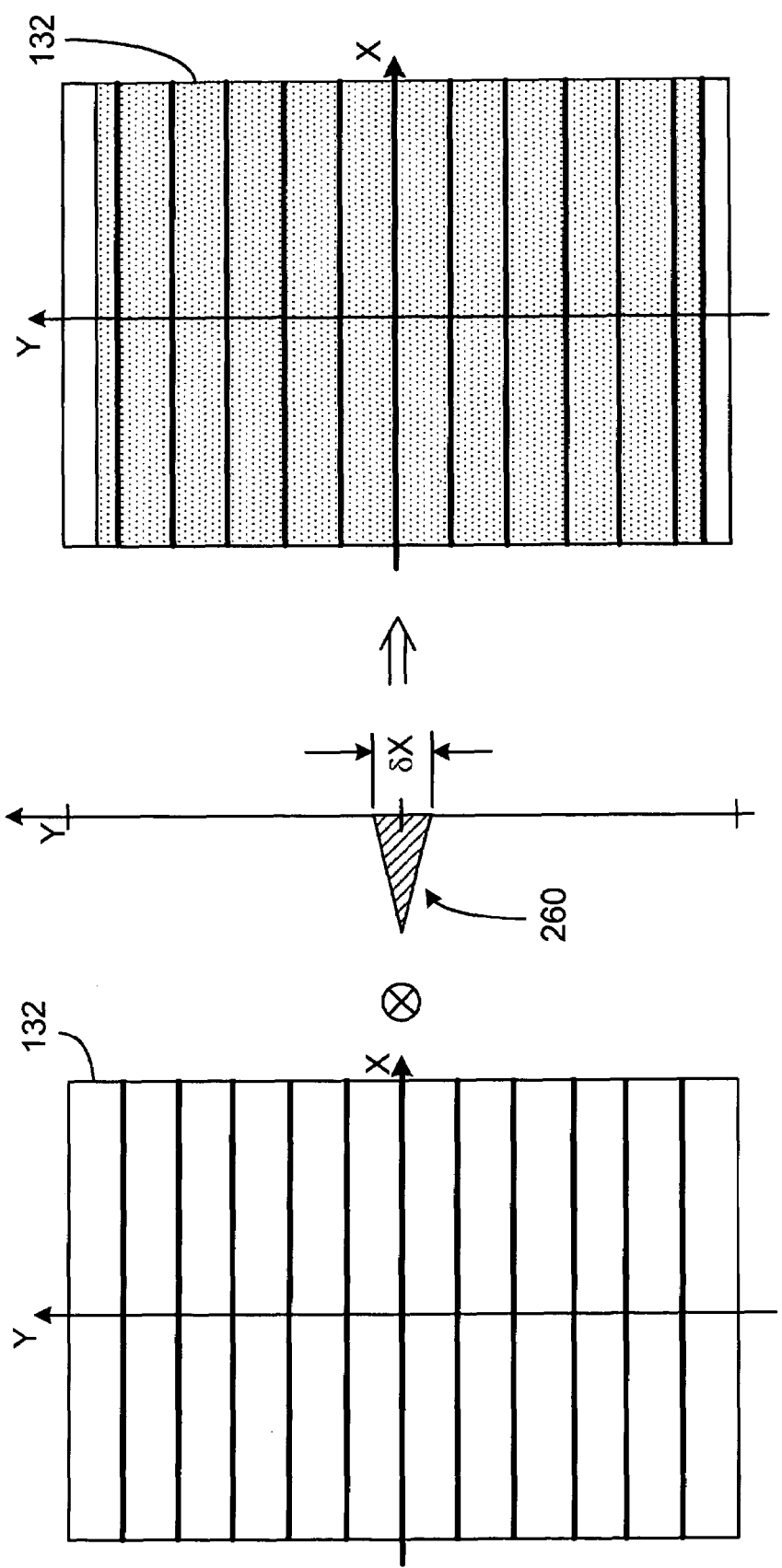
FIG. 25 shows a process for generating a filled view volume.

Referring to FIG. 25, the view volume 132 can be "filled up" by applying a filter 260 to each image slice in FIGS. 7 and 8. In one example, the filter 260 is a triangular function having a width δY. Increasing or decreasing the width δY will increase or decrease, respectively, the amount of blending between adjacent image slices in generating the view volume 132.

In FIG. 6, when capturing images of the object 124, the digital camera 120 does not necessarily have to be placed at regular intervals on the observation surface 108. For example, the interval between adjacent capture positions can be smaller for a certain range of view angles and be larger for other view angles. Similarly, if imaging software were used to synthesize the images, the locations of the synthetic cameras could be spaced unevenly along the observation surface 108. In such cases, the view volume 132 would have image slices that are not evenly spaced apart.

The presentation images can be projected from positions on the presentation surface 104 that are not evenly spaced apart. In this case, the spacing between calibration surfaces in the view volume 132 would also not be evenly spaced apart. Uneven spacing of the image capture positions and uneven spacing of the presentation image projection positions are useful when the object 124 has more complex or interesting features facing particular view angles. This allows observation of the object at different view angles with finer granularity when viewed from a certain range (or certain ranges) of view angles.

The 3-D display can be used to show 3-D images of representations of data, such as 3-D bar graphs, pie charts, flow charts, block diagrams, mesh graphs, scatter plots, vector diagrams, density plots, elevation plots, etc.

Different types of multi-view 3-D displays can be used, such as parallax barrier displays and lenticular sheet displays, described in the Ph. D. thesis of Michael W. Halle, "Multiple Viewpoint Rendering for Three-Dimensional Displays," submitted to Massachusetts Institute of Technology in June 1997. Another example of a suitable three-dimensional display is MIT's Holovideo, which is described in (##http://xenia.media.mit.edu/~lucente/holo/holovideo.html##). The Holovideo uses acoustically driven crystals to create holographic fringe patterns. For different types of 3-D displays, the calibration surfaces are adjusted to match the physical parameters of the particular displays.

What is claimed is:

1. An image data processing apparatus comprising:
    a storage to store a set of image data representing a three-dimensional scene;
    a data processor to sample data points from the set of image data representing the three-dimensional scene to generate projection data, the sampling based on the position of an image surface relative to the position of a presentation surface; and
    a projection device to project modulated light rays from the presentation surface onto the image surface based on the projection data and generating a three-dimensional image that is representative of the three-dimensional scene;
    wherein the data processor samples different data points from the same set of image data responsive to changes in the position of the image surface relative to the presentation surface to generate projection data that can be used to generate a three-dimensional image that is representative of the three-dimensional scene.

2. The image data processing apparatus of claim 1, in which the projection device projects light rays that are modulated by a spatial light modulator, and the light rays are focused on the positions from which the light rays appear to be projected.

3. The image data processing apparatus of claim 2, in which the spatial light modulator modulates the light rays based on the projection data.

4. The image data processing apparatus of claim 1, in which the image surface diffuses the light rays only along a specified direction.

5. The image data processing apparatus of claim 1, in which the three-dimensional scene comprises at least one of a collection of points, a collection of lines, a collection of surfaces, and a collection of volumes.

6. The image data processing apparatus of claim 1, in which the data processor generates projection data that specify at least one of color and brightness of light rays that propagate along specified paths relative to the image surface.

7. The method image data processing apparatus of claim 1, in which the data representing the three-dimensional scene comprises information about observations of the three-dimensional scene from different positions.

8. The image data processing apparatus of claim 7, in which the data representing the three-dimensional scene comprises images of the three-dimensional scene captured by at least one camera from different positions.

9. The image data processing apparatus of claim 8, in which the camera has a pixel resolution that is different from a pixel resolution of a spatial light modulator used to modulate the projected light rays.

10. The image data processing apparatus of claim 8, in which the data processor samples data to compensate for distortions in the images.

11. The image data processing apparatus of claim 7, in which the data representing the three-dimensional scene comprises synthesized images of the three-dimensional scene as viewed from different positions.

12. The image data processing apparatus of claim 11, in which the synthesized images each has a pixel resolution that is different from a pixel resolution of a spatial light modulator used to modulate the projected light rays.

13. The image data processing apparatus of claim 1, in which the projection device projects a first set of modulated light rays from a first position during a first interval, and projects a second set of modulated light rays from a second position during a second interval.

14. The image data processing apparatus of claim 1, in which the three-dimensional image comprises an image of at least one of an accurate copy, an approximation, a closer view, and a farther view of the three-dimensional scene.

15. The image data processing apparatus of claim 1, in which the data representing the three-dimensional scene comprises information about at least one of color and brightness of light rays emanating from the three-dimensional scene.

16. The image data processing apparatus of claim 1 in which the data processor generates the projection data by sampling data from image data representing two-dimensional images of the three-dimensional scene as viewed from various locations, each set of projection data corresponding to one of multiple projection positions, each set of projection data comprising data sampled from multiple two-dimensional images, the sets of projection data having information representing light rays that, when projected from respective multiple projection positions, generate the three-dimensional image representative of the three-dimensional scene.

17. The image data processing apparatus of claim 1 in which the data processor samples a view volume that comprises data representing images of the three-dimensional scene as viewed from various locations, to generate sets of projection data, each set of projection data corresponding to one of multiple projection positions, each set of projection data comprising data sampled from at least two images.

18. The image data processing apparatus of claim 1 in which the data processor generates a view volume that comprises data representing observations of a three-dimensional scene from different positions and
- samples the view volume to generate a first set of projection data, the sampling based on at least a position of a first image surface relative to a position of a first presentation surface;
- a spatial light modulator modulates light rays based on the first set of projection data to generate a first set of presentation images at the first presentation surface;
- the projection device projects the first set of presentation images from the first presentation surface toward the first image surface to reproduce a first three-dimensional image that is representative of the three-dimensional scene;
- the data processor samples the same view volume to generate a second set of projection data, the sampling based on at least a position of a second image surface relative to a position of a second presentation surface;
- the spatial light modulator modulates light rays based on the second set of projection data to generate presentation images at the second presentation surface; and
- the projection device projects the presentation images from the second presentation surface toward the second image surface to reproduce a second three-dimensional image that is representative of the three-dimensional scene;
- wherein at least one of (i) the first image surface being different from the second image surface, and (ii) the first presentation surface being different from the second presentation surface.

19. The image data processing apparatus of claim 1 in which the data processor sends at least one physical parameter of the image data processing apparatus to a server having data representing a three-dimensional scene;
- the data processor receives projection data from the server, the projection data derived by sampling the data representing the three-dimensional scene based on the at least one physical parameter of the image data processing apparatus, wherein for different image data processing apparatuses having different physical parameters, the server samples different data points from the same data representing the three-dimensional scene based on the physical parameters of the image data processing apparatuses to generate different projection data
- the projection device projects light rays based on the projection data to generate a three-dimensional image of the three-dimensional scene.

20. The image data processing apparatus of claim 19,
- in which the data processor sends at least one physical parameter of the image data processing apparatus to a second server having data representing a second three-dimensional scene;
- the data processor receives a second set of projection data from the second server, the second set of projection data derived by sampling the data representing the second three-dimensional scene based on the at least one physical parameter; and
- the projection device projects light rays based on the projection data to generate a three-dimensional image of the second three-dimensional scene.

21. The image data processing apparatus of claim 1 in which the data processor receives at least one physical parameter of a first projection system;
- the data processor generates a first set of projection data by sampling the data representing the three-dimensional scene based on the at least one physical parameter of the first projection system;
- the data processor transmits the first set of projection data to the first projection system to enable the first projection system to project light rays based on the first set of projection data to generate a three-dimensional image of the three-dimensional scene;
- the data processor receives at least one physical parameter of a second projection system;
- the data processor generates a second set of projection data by sampling the same data representing the three-dimensional scene based on the at least one physical parameter of the second projection system; and
- the data processor transmits the second set of projection data to the second projection system to enable the second projection system to project light rays based on the projection data to generate a three-dimensional image of the three-dimensional scene.

22. The image data processing apparatus of claim 1 in which the data processor generates a stream of data representing observations of a three-dimensional scene from a set of positions;
- at a given time, the data processor stores a subset of the stream of data in the storage, the subset representing observations of the three-dimensional scene from a subset of the positions;
- the data processor generates a stream of projection data by sampling the stored subset of the stream of data; and
- the projection device projects light rays based on the stream of projection data to generate a three-dimensional image of scene.

23. The image data processing apparatus of claim 22, in which the projection device defines the image surface onto which the light rays are projected.

24. The image data processing apparatus of claim 23, in which the data processor samples the stored subset of the stream of data based on at least one of:
(a) a position of the image surface relative to positions from which the light rays appear to be projected,
(b) a position of the image surface relative to intended observation positions for observing the three-dimensional image,
(c) a size of the image surface,
(d) an extent of positions from which the light rays appear to be projected, and
(e) a shape of the image surface.

25. The image data processing apparatus of claim 22, in which the stream of data representing observations of the scene ends after data representing observations of the scene from all of the set of positions have been generated.

26. The image data processing apparatus of claim 22, in which the stream of data representing observations of the scene repeats itself after data representing observations of the scene from all of the set of positions have been generated.

27. The image data processing apparatus of claim 1, in which
the data processor generates sets of projection data by sampling data from image data representing two-dimensional images of a three-dimensional scene as viewed from various locations, each set of projection data corresponding to one of multiple projection positions, each set of projection data comprising data sampled from multiple two-dimensional images; and
the projection device projects light rays based on the sets of projection data from respective multiple projection positions to generate a three-dimensional image that is representative of the three-dimensional scene.

28. The apparatus of claim 1, in which the projection device defines the image surface onto which the light rays are projected.

29. The apparatus of claim 1, in which the data processor samples the data also based on at least one of (a) a size of the image surface, (b) a shape of the image surface, and (c) a position of the image surface relative to intended observation positions for observing the three-dimensional image.

30. The apparatus of claim 1, in which the projection device comprises a spatial light modulator that modulates light rays according to the projection data.

31. The apparatus of claim 30, in which the projection device defines projection positions from which light rays modulated by the spatial light modulator appear to be projected.

32. The apparatus of claim 31, in which the data processor samples the data based on at least one of (a) a position of the image surface relative to the projection positions, and (b) a farthest distance between any two projection positions.

33. The apparatus of claim 31, in which the spatial light modulator modulates light rays to generate different presentation images at different times according to the projection data, and the projection device projects the presentation images from different projection positions in a time-division-multiplexed manner.

34. The apparatus of claim 1 in which the set of image data is represented by a view volume in a ray space having a coordinate system in which coordinates on a first axis represent coordinates on an image surface and coordinates on a second axis represent coordinates on a capture surface, the view volume comprising image slices representing two-dimensional images of the three-dimensional scene as viewed from various locations on the capture surface.

35. The apparatus of claim 34 in which the data processor samples data points from the set of image data based on one or more calibration surfaces that intersect the view volume.

36. The apparatus of claim 35 in which the calibration surfaces are skewed with respect to the image slices by an amount dependent on at least one of (i) relative positions of the image surface and the presentation surface, and (ii) relative sizes of the image surface and an intended observation surface.

37. The apparatus of claim 35 in which the calibration surfaces are curved.

38. The server of claim 34 wherein the data processor samples data points from the set of image data based on one or more calibration surfaces that intersect the view volume.

39. An image data processing server comprising:
a storage to store a set of image data representing a three-dimensional scene;
a data processor to
receive information about geometries of presentation surfaces and image surfaces of various client projection devices,
for each client projection device, generate a set of projection data by sampling data points from the set of image data representing the three-dimensional scene based on the information about the geometry of the presentation surface and the image surface of the client projection device,
for different client project devices having different geometries of presentation and image surfaces, sample different data points from the same set of image data, and
transmit each set of projection data to the corresponding client projection device to enable each client projection device to project light rays based on the corresponding set of projection data to generate a three-dimensional image of the three-dimensional scene.

40. The server of claim 39 wherein the set of image data is represented by a view volume in a ray space having a coordinate system in which coordinates on a first axis represent coordinates on an image surface and coordinates on a second axis represent coordinates on a capture surface, the view volume comprising image slices representing two-dimensional images of the three-dimensional scene as viewed from various locations on the capture surface.

* * * * *